United States Patent
Lu et al.

(10) Patent No.: US 12,556,004 B2
(45) Date of Patent: Feb. 17, 2026

(54) MANAGING RENEWABLE ENERGY DISRUPTION

(71) Applicant: TOYOTA MOTOR NORTH AMERICA, INC., Plano, TX (US)

(72) Inventors: Norman Lu, Fairview, TX (US); Maximilian Parness, Takoma Park, MD (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 27 days.

(21) Appl. No.: 18/376,833

(22) Filed: Oct. 4, 2023

(65) Prior Publication Data

US 2025/0118966 A1    Apr. 10, 2025

(51) Int. Cl.
*H02J 3/32* (2006.01)
*G06F 1/26* (2006.01)
*H02J 3/00* (2006.01)
*H02J 3/38* (2006.01)

(52) U.S. Cl.
CPC ............... *H02J 3/322* (2020.01); *G06F 1/26* (2013.01); *H02J 3/004* (2020.01); *H02J 3/38* (2013.01); *H02J 2300/20* (2020.01)

(58) Field of Classification Search
CPC .... H02J 3/322; H02J 3/004; H02J 3/38; H02J 2300/20; G06F 1/26
See application file for complete search history.

(56) References Cited

U.S. PATENT DOCUMENTS

| | | | |
|---|---|---|---|
| 7,925,387 B2 | 4/2011 | Zheng et al. |
| 8,604,641 B2 | 12/2013 | Walker |
| 9,124,098 B2 | 9/2015 | Broniak et al. |
| 9,300,141 B2 | 3/2016 | Marhoefer |
| 9,489,701 B2 | 11/2016 | Emadi et al. |
| 10,283,964 B2 | 5/2019 | Wagoner et al. |
| 11,404,871 B1 | 8/2022 | Hansen et al. |
| 2010/0138062 A1 | 6/2010 | Zheng et al. |

(Continued)

FOREIGN PATENT DOCUMENTS

| | | |
|---|---|---|
| EP | 2292930 A2 | 3/2011 |
| EP | 3624292 A1 | 3/2020 |

OTHER PUBLICATIONS

Douris, Electric Vehicle-To-Grid Services Can Feed, Stabilize Power Supply, Forbes, Dec. 18, 2017.

*Primary Examiner* — Rexford N Barnie
*Assistant Examiner* — Thai H Tran

(57) ABSTRACT

An example operation includes one or more of determining a severity and a duration of a predicted deficiency of a renewable energy source in an area, responsive to the severity being above a first threshold and the duration being above a second threshold, providing stored energy from energy storage units in the area during the duration to overcome a portion of the predicted deficiency, and responsive to the severity being further above a third threshold and the duration being above a fourth threshold, providing stored energy from vehicles in the area during the duration to overcome another portion of the predicted deficiency, wherein the third threshold is greater than the first threshold, and the fourth threshold is greater than the second threshold.

15 Claims, 25 Drawing Sheets

(56) References Cited

U.S. PATENT DOCUMENTS

| | | | |
|---|---|---|---|
| 2012/0161713 A1* | 6/2012 | Kim | H02J 3/322 |
| | | | 320/134 |
| 2012/0277923 A1* | 11/2012 | Tsuchiya | B60L 53/53 |
| | | | 700/291 |
| 2012/0293109 A1 | 11/2012 | Glazer | |
| 2014/0049053 A1* | 2/2014 | Inoue | H02J 7/35 |
| | | | 290/30 R |
| 2014/0129040 A1 | 5/2014 | Emadi et al. | |
| 2014/0371936 A1 | 12/2014 | Kamel et al. | |
| 2022/0190597 A1 | 6/2022 | Tural | |
| 2023/0139514 A1 | 5/2023 | Tennant | |

* cited by examiner

270

400A

400D

MANAGING RENEWABLE ENERGY DISRUPTION

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

One example embodiment provides a method that includes one or more of determining a severity and a duration of a predicted deficiency of a renewable energy source in an area, responsive to the severity being above a first threshold and the duration being above a second threshold, providing stored energy from energy storage units in the area during the duration to overcome a portion of the predicted deficiency, and responsive to the severity being further above a third threshold and the duration being above a fourth threshold, providing stored energy from vehicles in the area during the duration to overcome another portion of the predicted deficiency, wherein the third threshold is greater than the first threshold, and the fourth threshold is greater than the second threshold.

Another example embodiment provides a system that includes a memory communicably coupled to a processor, wherein the processor performs one or more of determine a severity and a duration of a predicted deficiency of a renewable energy source in an area, responsive to the severity that is above a first threshold and the duration that is above a second threshold, provide stored energy from energy storage units in the area during the duration to overcome a portion of the predicted deficiency, and responsive to the severity that is further above a third threshold and the duration that is above a fourth threshold, provide stored energy from vehicles in the area during the duration to overcome another portion of the predicted deficiency, wherein the third threshold is greater than the first threshold, and the fourth threshold is greater than the second threshold.

A further example embodiment provides a computer readable storage medium comprising instructions that, when read by a processor, cause the processor to perform one or more of determining a severity and a duration of a predicted deficiency of a renewable energy source in an area, responsive to the severity being above a first threshold and the duration is above a second threshold, providing stored energy from energy storage units in the area during the duration to overcome a portion of the predicted deficiency, and responsive to the severity being further above a third threshold and the duration being above a fourth threshold, providing stored energy from vehicles in the area during the duration to overcome another portion of the predicted deficiency, wherein the third threshold is greater than the first threshold, and the fourth threshold is greater than the second threshold.

DETAILED DESCRIPTION

Figure 1A:
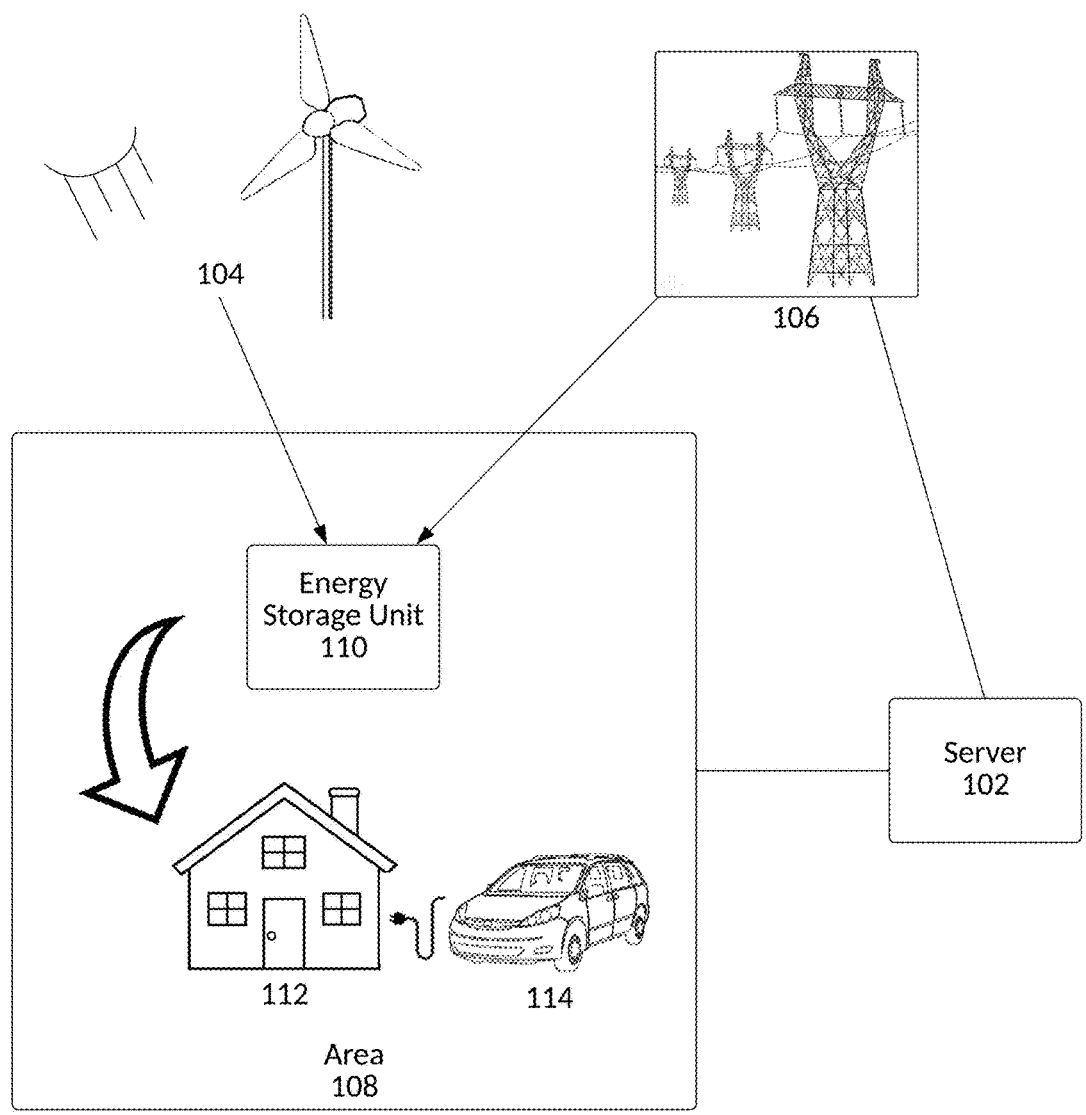
FIG. 1A illustrates an example system diagram, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable media or a non-transitory computer readable storage medium.

Communications between the vehicle(s) and certain entities, such as remote servers, other vehicles and local computing devices (e.g., smartphones, personal computers, vehicle-embedded computers, etc.) may be sent and/or received and processed by one or more 'components' which may be hardware, firmware, software or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one example. Thus, appearances of the phrases "example embodiments," "in some embodiments," in other embodiments," or other similar language throughout this specification can all refer to the same embodiment. Thus, these embodiments may work in conjunction with any of the other embodiments, may not be functionally separate, and the described features, structures, or characteristics may be combined in any suitable manner in one or more embodiments. Although described in a particular manner, by example only, or more feature(s), element(s), and step(s) described herein may be utilized together and in various combinations, without exclusively, unless expressly indicated otherwise herein. In the diagrams, any connection between elements can permit one-way and/or two-way communication, even if the depicted connection is a one-way or two-way arrow. In the current solution, a vehicle may include one or more of cars, trucks, Internal Combustion Engine (ICE) vehicles, battery electric vehicle (BEV), e-Palettes, fuel cell bus, motorcycles, scooters, bicycles, boats, recreational vehicles, planes, drones, Unmanned Aerial Vehicle (UAV) and any object that may be used to transport people and or goods from one location to another. In the diagrams, any connection between elements can permit one-way and/or two-way communication, even if the depicted connection is a one-way or two-way arrow. In the current solution, a vehicle may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable media, devices, and/or networks, which provide at least one of a transport (also referred to as a vehicle or car herein), a data collection system, a data monitoring system, a verification system, an authorization system, and a vehicle data distribution system.

The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, GPS, maps, cameras, sensors and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

The instant solution manages renewable energy disruption by storing renewable and nonrenewable energy, an excess amount of energy in an energy storage unit in an area affected by the energy disruption. The excess stored energy is provided to the location during the energy disruption to provide a portion of the needed energy at the location. An electric vehicle (EV) connected to the location provides to the location excess stored energy in a battery in the electric vehicle to provide another portion of the needed energy at the location.

An electrical provider provides electricity using many different elements, including but not limited to substations, power poles, and transformer drums. The substations may divide the generated power into areas where all locations in the area utilize a single substation. If the substation goes down, all locations serviced by that substation experience an outage. A substation will service up to around 1500 customers in a connected area. Many of the customers in an area may have renewable energy sources such as solar, wind, micro hydropower, and hybrid electric systems such as solar and wind. Customers in the area may also have electric vehicles, where the vehicles connect to the location (e.g., home) to receive a charge. A bidirectional charging device may also be included wherein the electric vehicle may provide electricity back into the location.

FIG. 1A depicts a network diagram 100 for managing renewable energy disruption, according to example embodiments. Area 108 is shown, including a location (house 112), one or more vehicles 114, and an energy storage unit 110, which may be associated with the location. Vehicle 114 may connect to location 112 to receive and/or give electricity. The energy storage unit may be any device containing a battery that may be used for storing energy from renewable 104 and non-renewable 106 energy sources. Server 102 may also be connected to the area through a network (not depicted). Server 102 may be connected and communicate with the non-renewable energy provider 106 and processors in the area, such as processors associated with location 112, the energy storage unit 110, and/or vehicle 114.

The instant solution may execute in one or more of server 102, a processor associated with vehicle 114, a processor associated with location 112, a processor associated with energy storage unit 110, and/or any processor included herein.

The instant solution predicts that a renewable energy source 104 will not produce the recommended amount of power, such as in a scenario where there is a brownout/blackout in the area. This prediction may be based on data received from the energy provider 106 and/or determined by server 102 through analysis of predictive data as further disclosed herein. When system 100 predicts a deficiency in renewable energy 104 for area 108, the system directs excess energy to be stored in one or more energy storage units 110 in the area. The energy may originate from renewable energy 104 and/or non-renewable energy 106. When the deficiency occurs, the previously stored energy in the one or more energy storage units 110 to counter the energy deficiency for area 108. In another embodiment, electric vehicles 114 in the area, with electricity stored in their batteries, can also provide energy to locations 112, further offsetting the deficiency of energy.

In one embodiment, a predictive analysis system is used in system 100 to perform the predicted deficiency of the renewable energy source. Sensor Arrays may be used to gauge the availability of renewable energy sources, such as wind, sunlight, etc. These weather sensors may include one or more anemometers, solar radiance detectors, and temperature sensors. Data from the sensor arrays may be received and analyzed by a data analysis unit, which may be functionality included in server 102, for example. The data analysis unit may use predictive functionality to determine the future availability of renewable energy sources. A severity determination functionality may be included in server 102 to determine the severity of the predicted deficiency based on the difference between the forecasted energy generated as compared to the expected demand in the area. Duration estimation functionality, also in server 102, may be employed to calculate the expected duration of the energy deficiency of the renewable energy source by an analysis of historical data and real-time forecasts, as received from previously determined data as disclosed herein.

An energy storage infrastructure is used to store the excess energy from one or more of the energy storage units 110 and vehicle 114. Primary energy storage units may be strategically located throughout area 108 to store excess energy from renewable (solar, wind, etc.) and non-renewable (fossil fuels) sources. These devices are storage devices and may include one or more of lithium-ion batteries, flow batteries, pumped hydro storage units, and the like. Secondary energy storage in vehicle 114 may be employed in electric vehicles equipped with bi-directional charging capabilities, allowing them to return stored energy to the grid and/or location 112 in area 108, for example. A storage management system may be used to prioritize energy discharge of the primary energy storage units during the predicted deficiency while coordinating with the electric vehicles in the area for additional support if needed. The storage management system monitors and controls the primary energy storage units and energy stored in the electric vehicles in area 108.

Effective energy distribution in area 108 is managed by different functionalities in system 100. When a deficiency is predicted, a grid management functionality in server 102 is used to manage the discharge of stored energy in the energy storage unit 110 and/or the electric vehicle 114. The electric vehicle's bi-directional charging system is used to provide energy to location 112 in the area when the electric vehicle is connected. The grid management functionality may also categorize and prioritize consumption loads (both predicted and actual) in location 112. In one embodiment, essential services such as hospitals and/or emergency services may be prioritized to ensure that electricity is provided by system 100, regardless of the severity and/or duration of the electricity deficiency. An integrated communication framework connects the data analysis unit, storage management system, grid management functionality, and electric vehicles 114. The integrated communication framework may use protocols that ensure real-time transmission and reception of data and commands.

Post-deficiency analysis may be employed by system 100 to analyze the effectiveness of the predictions of system 100 and the efficiency of the energy distribution. Any deviations from the predicted models may be fed back into the predictive functionality to refine future predictions.

A user interface may be part of system 100, available to both grid operators and connected electric vehicle operators, allowing the operators to oversee and control the system while providing the electric vehicle operators insights about the grid's state, potential revenue from V2G operations, and notifications about upcoming deficiencies.

Figure 1B:
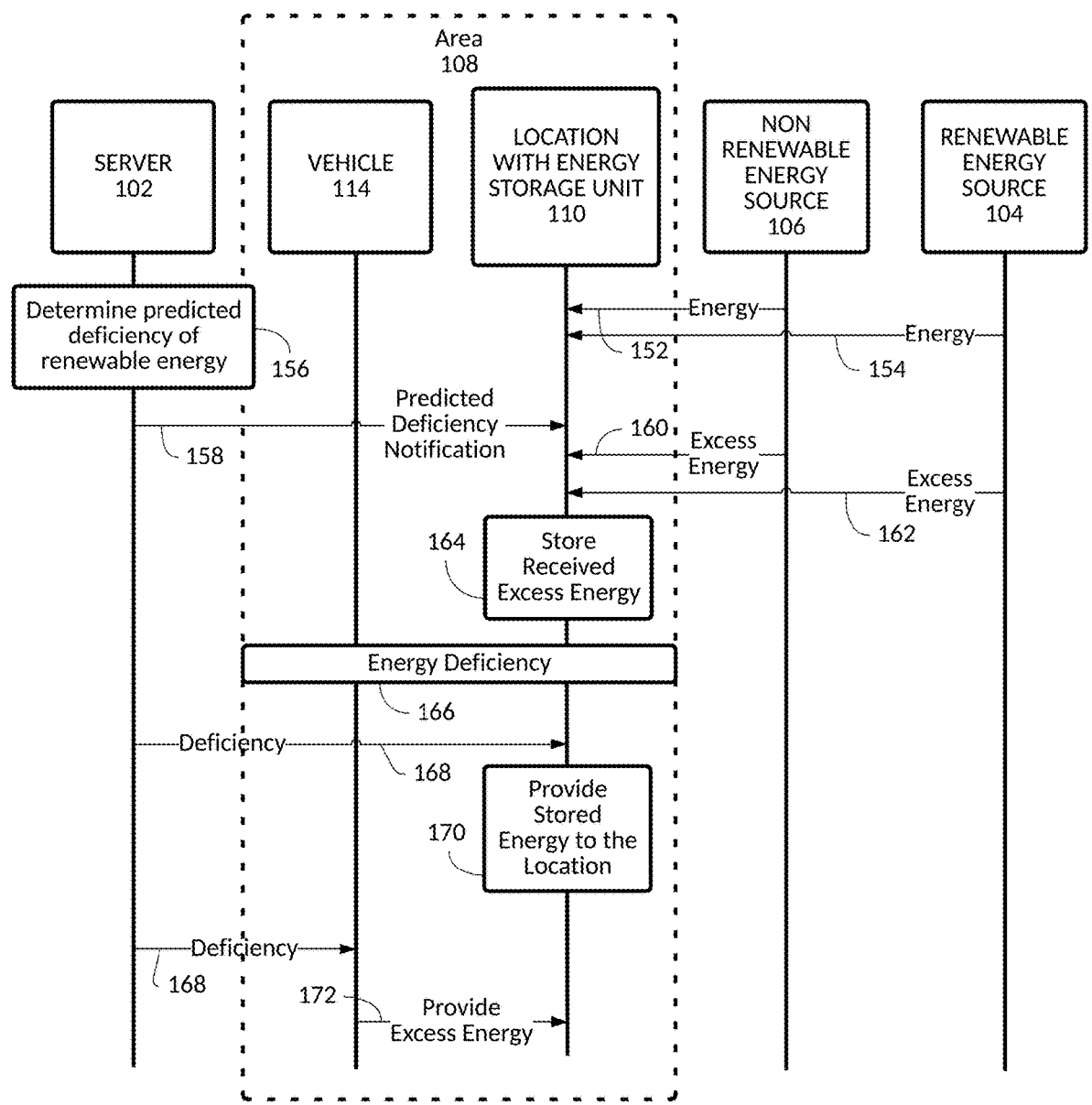
FIG. 1B illustrates a further example flowchart, according to example embodiments.

FIG. 1B depicts a flowchart 150 of managing renewable energy disruption, according to example embodiments. Area 108 may be a geographic such as a city that contains several customers of an energy provider 106. The customers may be associated with location 110 in area 108. Location 110 may have an energy storage unit associated with it. The energy storage unit may be a device containing a processor and a battery and is able to store energy received from one or more of renewable 104 and nonrenewable 106 energy sources. This area may be served as a group, receiving electricity from the provider 106. In other embodiments, area 108 is a group of locations 110, such as homes or businesses, not tied to an energy provider. This area may generate and obtain energy from renewable sources like wind, solar, and water. Vehicle 114 may be one of many vehicles in area 108 and may be an electric vehicle that is able to receive and/or provide energy to location 110 when connected to location 110. A server 102 may be associated with area 108, location 110, and/or other devices in system 150. Server 102 may communicate with entities within area 108, such as location 110, vehicle 114, and/or any other device containing a processor and memory, such as wearable devices, computers, laptops, tablets, home networks, and the like.

Energy is received 152 and 154 from nonrenewable energy sources 106 and renewable energy sources 104. Received energy is stored in a battery in the energy storage unit 110, which may be used to power all or a portion of the location when needed, such as when energy from nonrenewable energy source 106 is disabled through a brownout or blackout, for example. Server 102 determines that there is a predicted deficiency in renewable energy 156 of area 108. This may be due to a weather pattern or any other predicted event that may cause renewable energy to be lower for a time compared to normal energy generation. Server 102 may obtain weather-related information from other servers, such as those associated with weather data, which may be queried through a network, such as the Internet.

When this predicted deficiency of energy 156 is determined by server 102, a predicted deficiency notification 158 or a similar message may be sent to the energy storage unit 110. In other embodiments, the message is sent to a processor associated with location 110, such as a processor in a home network, and devices associated with occupants of the location (e.g., mobile devices, computers, and the like). The message directs the energy storage unit 110 to store excess energy from the nonrenewable energy source 106 and renewable energy source 104. The excess energy may be energy that the renewable energy source 104 is able to obtain before a time of the predicted deficiency of energy and/or may be energy that is normally consumed by location 110 but for a period before the predicted deficiency is not consumed. For example, the received message 158 may initiate a notification that may be displayed on a device, indicating that energy conservation is necessary for an amount of time due to an upcoming lack of renewable energy.

Excess energy 160 and 162 from the nonrenewable energy source 106 and renewable energy source 104 are stored 164 in the energy storage unit 110 for the period before the determined predicted deficiency of renewable energy 156. The energy storage unit may proceed to store received energy from the nonrenewable energy source 106 and the renewable energy source 104 to store energy in the battery associated with the energy storage unit. The received message 168 may also indicate a battery capacity level that is recommended to be reached in the energy storage unit. For example, the energy storage unit may normally retain a capacity of 60%, but due to the reception of message 168, the energy storage unit may be directed to store received energy at a higher capacity, such as 95%.

Area 108 experiences the predicted energy deficiency 166. Server 102 may verify the renewable energy deficiency, which may be verified by analysis of received data from other servers associated with weather patterns. Server 102 sends a deficiency message 168 to the location with the energy storage unit 110. The message may be received by a processor associated with the energy storage unit. The received message 168 directs the energy storage unit 170 to provide the stored excess energy 160 and 162 to the location 172. This provision of stored energy may be higher than the energy provided to the location otherwise and serves to overcome the deficiency of renewable energy during the period. In another embodiment, server 102 may send a deficiency message 168 to vehicle 114, wherein a processor associated with the vehicle provides a portion of stored energy in batteries in the vehicle to location 110. Vehicle 114 connects to location 110 and, through a bi-directional connection, provides energy to location 110. Server 102 may send message 168 to other vehicles in area 108 to provide energy to one or more locations 110 in area 108, such as autonomous and non-autonomous vehicles.

In one embodiment, the capability to forecast and analyze energy production from renewable sources within a specific area is achieved through integration with meteorological data sources, such as servers 102 associated with a weather-related entity. These sources provide predictions about environmental conditions that impact renewable energy generation, such as sunlight, wind speed, and precipitation. When this data is obtained, the instant solution may predict a deficiency in the renewable energy source, which may be calculated as a percentage drop from the expected energy generation levels. Thresholds are established that direct the response of the system. These thresholds may be predefined in the system and may be based on factors like historical data, user preferences, and/or energy demand predictions. For example, a threshold might be set, for example, at a 40% drop in energy generation for more than 6 hours. When the predicted deficiency's severity surpasses a threshold, and the duration exceeds another threshold, the system determines that energy should originate from energy storage units within the area. This may be managed through a centralized or distributed control system that monitors the energy levels of all storage units in real time. The control system commands these storage units to discharge energy to the grid, thereby compensating for the energy deficiency. When the deficiency's severity goes even beyond another threshold (which is set higher than the first, e.g., a 60% drop) and lasts longer than another threshold (e.g., more than 9 hours), then the system harnesses energy stored in vehicles 114 within the area. Integration with vehicle-to-grid (V2G) technology allows for this. Vehicles, especially electric ones, can communicate with the grid and feed back their stored energy when required. The system would send signals to vehicles that are plugged in or available, instructing them to discharge a portion of their battery energy to the grid.

In one embodiment, the system of the instant solution may first possess an adeptness to assess the energy stored from renewable sources and juxtapose it against anticipated energy needs for a given time period. When the system determines that renewable sources will not be sufficient, the system initiates the process of storing any remaining energy that's being produced from non-renewable sources. This may be accomplished through real-time monitoring and control capabilities facilitated through a combination of sensors, smart meters, and a centralized control unit. When the discrepancy between supply from renewable sources and energy demand is detected, the system's control unit prioritizes and redirects energy from non-renewable sources to storage units, allowing energy storage units to capture and store this energy specifically at the time when the renewable energy production is anticipated to fall short.

In one example, solar and/or wind energy generation may be affected by weather conditions, such as continuous rain, and may lead to a decreased or zero energy output. In one embodiment, the system may consider the duration of the predicted non-productive solar output. For example, when the expected duration of this energy deficiency is between 6 to 9 hours, the system relies solely on the energy stored in the energy storage unit. This is based on the understanding that the ESU will likely have enough stored energy to bridge this short-term gap. When the expected duration of the energy deficiency exceeds 9 hours, the system incorporates another novel feature. In this scenario, electric vehicles 114 parked at the location 110 or nearby can be used as auxiliary energy sources. Modern EVs, may contain large battery capacities and bi-directional charging capabilities. The system communicates with the EV, determining how much energy can be safely extracted without compromising the vehicle's primary functionality. The decision to extract energy is based on the expected energy requirement of the location and the predicted routes or trips the vehicle will make in the near future. The system also assesses the severity of the energy deficiency. For example, if the rainy conditions are coupled with other factors like overcast conditions or very low light, the energy output from the solar panels might be even more severely impacted. The system quantifies this "severity" based on a combination of meteorological data, historical energy production data under similar conditions, and real-time energy output. If the severity is found to be "more severe than normal," the system triggers additional energy-saving measures within the location an/or sources more energy from other reserves, like neighboring homes or energy grids.

In one embodiment, a vehicle's 114 telematics may be utilized by the system to determine the navigation requirements of the vehicle, such as through communication with the vehicle processor. A battery management system (BMS) of a vehicle is used to measure the current energy stored in the batteries of the vehicle and communicate in real-time with an application of the instant solution, executing on a processor associated with a server 102. The system may determine energy needs based on predicted routes. The system can harness existing navigation and route prediction by analyzing historical route data, frequent destinations, time of day, and other contextual information, such as scheduled appointments from a driver's smart devices. The system can make predictions regarding the vehicle's intended destinations over a set period. Once the route is predicted, the anticipated energy consumption for that journey can be estimated, accounting for factors like distance, terrain, traffic conditions, and driving habits. The system determines a surplus of the stored energy by comparing the amount of stored energy (through communication with the vehicle's BMS, for example, compared with the predicted routes of the vehicle. When a surplus of energy is determined, the system then may determine that the surplus of energy in the vehicle may be utilized to address deficiencies in the energy requirements.

In one embodiment, devices in the location 110 are associated with a smart energy meter/tracking system that allows for the monitoring of real-time energy usage and communicates this data to the system. When the system determines that energy consumption at the location surpasses a predetermined threshold, energy-saving protocols may be initiated. These energy-saving protocols may involve sending alerts to users recommending they reduce usage, automatically adjusting device settings to more energy-efficient modes, or even temporarily shutting down non-essential devices. The excess energy saved by curtailing the operations or energy usage of these high-consuming devices is redirected and stored, such as in an energy storage unit. This stored energy thus becomes a reserve, available to be deployed when renewable energy sources are predicted to fall short of supplying the required demand.

When the predicted deficiency of renewable energy sources extends beyond an initially determined timeframe, the system may utilize vehicular energy resources in response to evolving energy needs. The system employs predictive analytics functionality that may continually monitor renewable energy sources, utilizing data from various sensors, weather prediction tools, and historical energy generation patterns. Once a predicted deficiency in renewable energy is identified, the system calculates its expected duration. If the actual duration starts to exceed this initial estimation, the need for alternative energy sources becomes paramount. Vehicles 114, especially electric vehiclescan play a significant role in this scenario. Modern EVs are equipped with substantial battery capacities and may allow for bidirectional energy transfer. This allows them to not only draw power from the grid for charging but also feed power back into the grid or directly to homes and businesses. A communication system, which may be wireless, connects the predictive analytics functionality that may reside within these vehicles. When the actual duration of the energy deficiency surpasses the initially predicted duration, the system communicates with the EVs within the affected area, instructing them to release their stored energy. Prioritization functionality can determine which vehicles to utilize into first, based on factors like their current battery levels, expected upcoming travel needs, and proximity to energy-demanding locations.

In one embodiment, the current application contains an integrated energy management system (IEMS) capable of monitoring and managing multiple energy sources-both stationary ones, like energy storage units, and mobile ones, like the batteries in electric vehicles. The IEMS is capable of collecting real-time data on the state of charge, capacity, and health of each energy storage source. The IEMS interfaces with devices in a location 110, such as a household or business. Each device's power consumption rate is monitored, which is accomplished using smart meters, IoT-enabled power monitors, or similar technologies. Over time, the IEMS accumulates data about the typical power demands of these devices, facilitating more precise energy distribution decisions. Upon detecting a deficiency in the renewable energy source, the IEMS begins its prioritization process. The stored energy from energy storage units primarily powers devices with an energy consumption rate above a certain threshold. The storage units may be utilized to provide power to high-demand appliances, such as heating systems, refrigerators, or industrial equipment, ensuring that these critical systems remain operational. Other devices with lower energy consumption rates, or those deemed less critical, can be powered using the stored energy from vehicles. Vehicles, especially those with bi-directional charging capabilities, can discharge their batteries to provide energy back to the grid or directly to specific locations.

In one embodiment, the distribution of stored excess energy is guided by a priority system for devices within a location 110, ensuring that devices deemed most essential receive adequate power during times of energy deficiency. The current solution may include an Advanced Energy Management System (AEMS). The primary role of this system is not only to monitor and manage energy sources but also to determine the priority of each device based on its importance or necessity in a particular setting. The system catalog every device in the location, assigning it a priority level. This can be manual, where users or administrators set the priority based on personal preferences or business needs, or it can be automated, where the AEMS assigns priorities based on typical usage patterns, device criticality, or other programmable criteria. In one embodiment, sensors, IoT devices, or smart plugs are utilized in this setup. They continuously provide the AEMS with data regarding the current energy consumption rates of the devices. Using this data, the AEMS calculates the energy requirement for each device, especially during periods when there's a prediction of renewable energy deficiency.

When a deficiency is predicted, the AEMS is initiated. If the duration and severity of the predicted deficiency are over certain thresholds (which may be dynamic or static), the AEMS begins drawing from the stored excess energy. Devices with a higher priority receive power first, or they are allocated a larger proportion of the available stored energy. This ensures that the most crucial devices remain operational. For instance, in a hospital setting, life-saving equipment would get priority over hallway lighting. Dynamic thresholds can be adjusted based on real-time data, such as weather predictions, current energy consumption patterns, or the state of charge of the storage units. Static thresholds can be pre-set based on historical data or predetermined criteria.

In one embodiment, the current solution may be seamlessly integrated into existing smart grid infrastructure, which already incorporates elements like smart meters, IoT sensors, and real-time data analytics. With this, the system gains instantaneous readings of energy consumption and production metrics from various households and businesses, allowing for more precise predictions of energy deficiencies. By tying the system with sophisticated weather prediction systems like the European Centre for Medium-Range Weather Forecasts (ECMWF) or the National Weather Service's supercomputers, the ability to anticipate disruptions in renewable energy sources, such as solar and wind, is enhanced. Blockchain technologies are employed to manage energy transactions securely. When the system anticipates an energy deficiency and engages energy storage units or vehicles to supply power, these transfers can be recorded on a transparent, immutable ledger. This ensures fair pricing and can even enable peer-to-peer energy sales. Locations 110 may employ smart assistant systems, implementing energy-saving measures, like dimming lights, adjusting thermostats, or delaying high-energy tasks. Beyond lithium-ion batteries, the system may utilize emerging technologies like solid-state batteries or even metal-air batteries. These offer higher energy densities and longer lifespans, making them perfect for storing excess energy in anticipation of deficiencies.

As electric vehicle charging infrastructure expands globally, the system works closely with electric vehicle charging stations. These stations are directed to reduce or halt charging operations during anticipated energy deficiencies, thus conserving power. In turn, when there's an excess of renewable energy, these stations can be directed to charge at faster rates. Feedback loops are employed that provide input on their experiences during energy deficiencies. This real-world feedback allows for the refinement of the system's predictive and response algorithms. The system may also interwork with apps on devices associated with users of the system. These apps provide real-time updates on energy forecasts, allow users to set preferences for energy conservation during deficiencies, and even gamify the energy-saving process.

Flow diagrams depicted herein, such as FIG. 1B, FIG. 2C, FIG. 2D, FIG. 2E, and FIG. 2F, are separate examples but may be the same or different embodiments. Any of the operations in one flow diagram could be adopted and shared with another flow diagram. No example operation is intended to limit the subject matter of any embodiment or corresponding claim.

It is important to note that all the flow diagrams and corresponding processes derived from FIG. 1B, FIG. 2C, FIG. 2D, FIG. 2E, and FIG. 2F may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
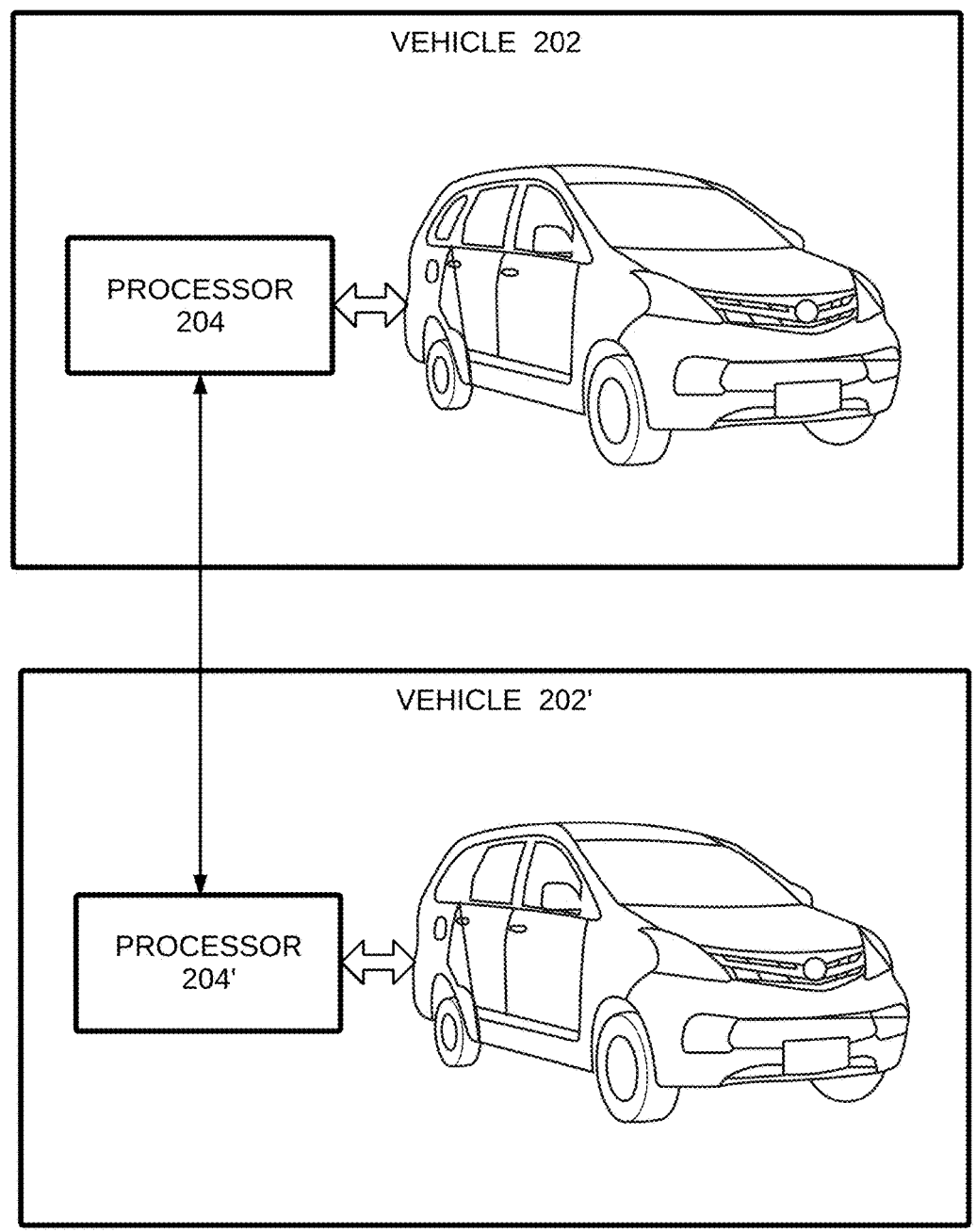
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
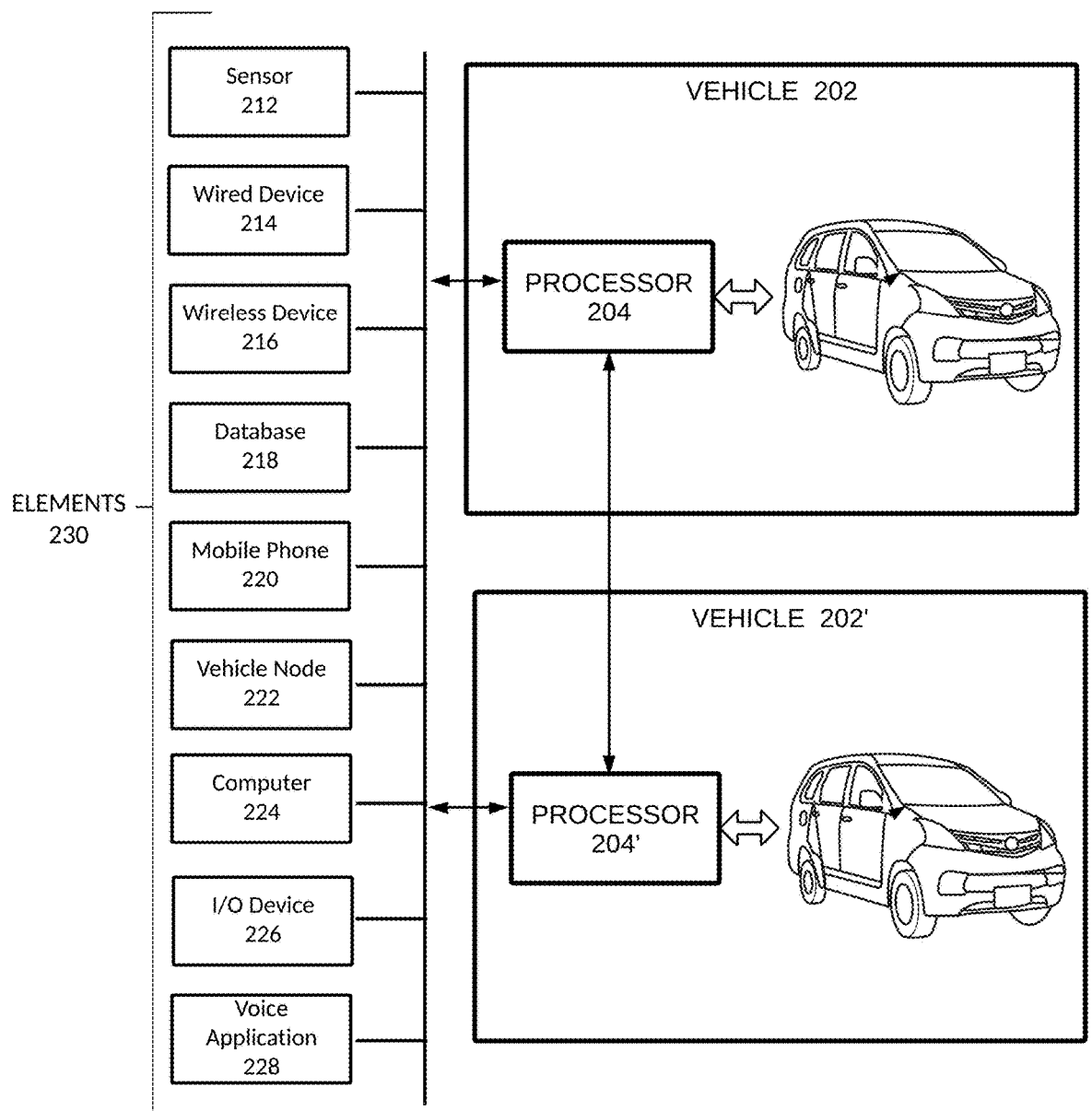
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, I/O device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

Figure 2C:
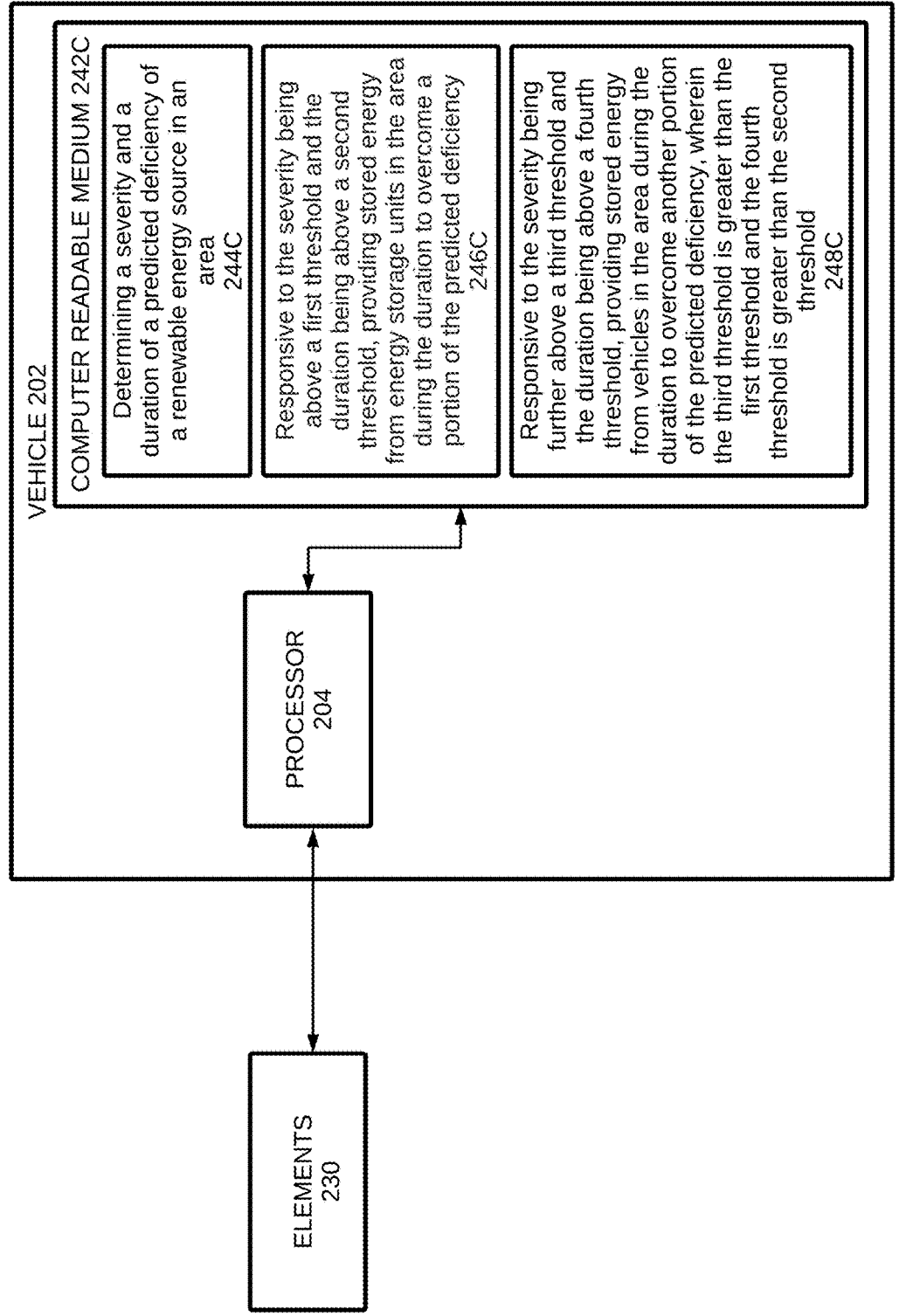
FIG. 2C illustrates yet another vehicle network diagram, according to example embodiments.

FIG. 2C illustrates yet another vehicle network diagram 240, according to example embodiments. The network comprises elements including a vehicle 202, a processor 204, and a non-transitory computer readable media 242C. The processor 204 is communicably coupled to the computer readable media 242C and elements 230 (which were depicted in FIG. 2B). The vehicle 202 could be a vehicle, server, or any device with a processor and memory.

The processor 204 performs one or more of determining a severity and a duration of a predicted deficiency of a renewable energy source in an area 244C, responsive to the severity being above a first threshold and the duration being above a second threshold, providing stored energy from energy storage units in the area during the duration to overcome a portion of the predicted deficiency 246C, and responsive to the severity being further above a third threshold and the duration being above a fourth threshold, providing stored energy from vehicles in the area during the duration to overcome another portion of the predicted deficiency, wherein the third threshold is greater than the first threshold and the fourth threshold is greater than the second threshold 248C.

Figure 2D:
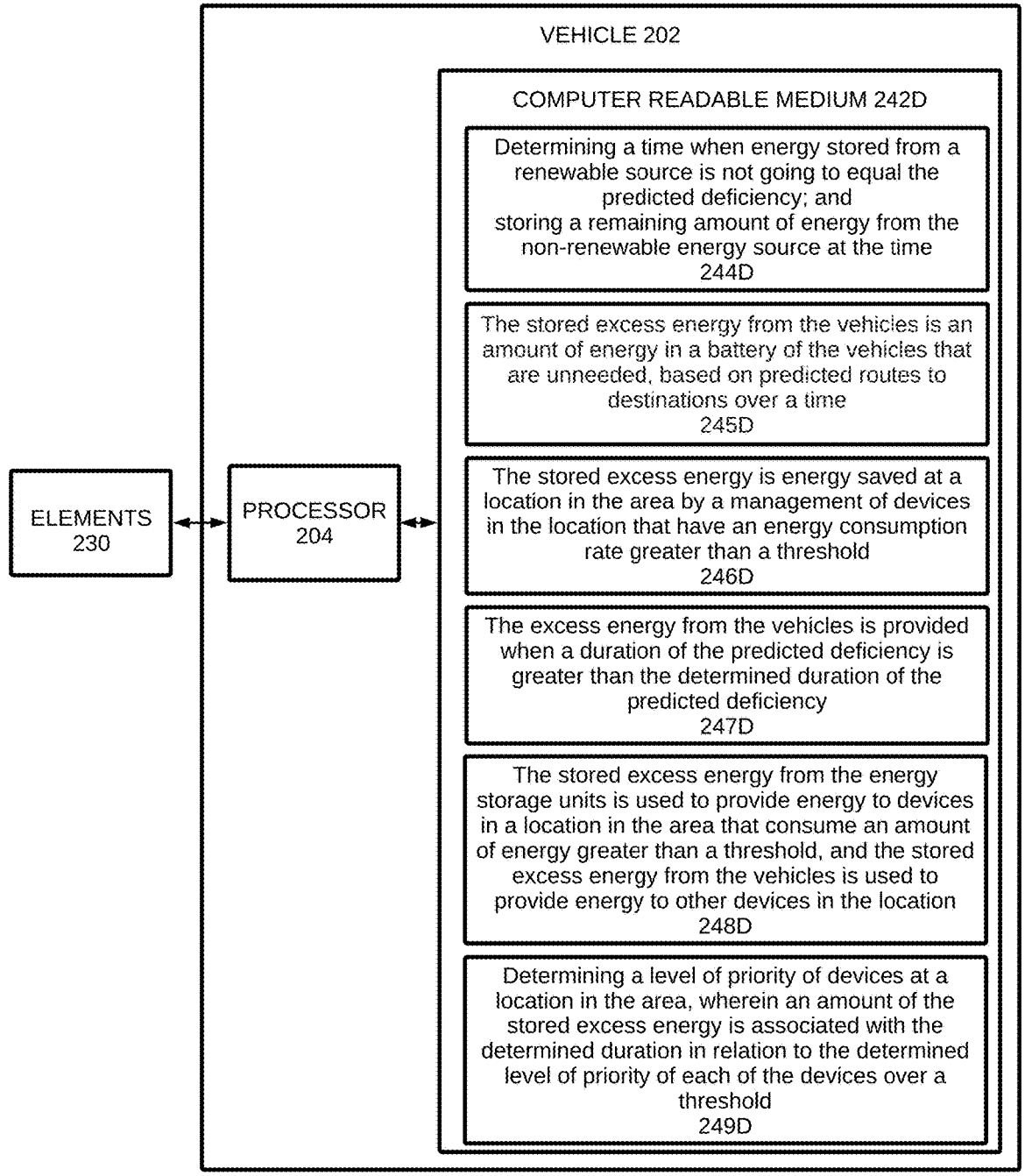
FIG. 2D illustrates a further vehicle network diagram, according to example embodiments.

FIG. 2D illustrates a further vehicle network diagram 250, according to example embodiments. The network comprises elements including a vehicle 202 a processor 204, and a non-transitory computer readable media 242D. The processor 204 is communicably coupled to the computer readable media 242D and elements 230 (which were depicted in FIG. 2B). The vehicle 202 could be a vehicle, server or any device with a processor and memory.

The processor 204 performs one or more of determining a time when energy stored from a renewable source is not going to equal the predicted deficiency; and storing a remaining amount of energy from the non-renewable energy source at the time 244D, the stored excess energy from the vehicles is an amount of energy in a battery of the vehicles that are unneeded, based on predicted routes to destinations over a time 245D, the stored excess energy is energy saved at a location in the area by a management of devices in the location that has an energy consumption rate greater than a threshold 246D, the excess energy from the vehicles is provided when a duration of the predicted deficiency is greater than the determined duration of the predicted deficiency 247D, the stored excess energy from the energy storage units is used to provide energy to devices in a location in the area that consumes an amount of energy greater than a threshold, and the stored excess energy from the vehicles is used to provide energy to other devices in the location 248D, and determining a level of priority of devices at a location in the area, wherein an amount of the stored excess energy is associated with the determined duration in relation to the determined level of priority of each of the devices over a threshold 249D.

While this example describes in detail only one vehicle 202, multiple such nodes may be connected to the blockchain 206. It should be understood that the vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the vehicle 202 may include multiple processors, multiple cores, or the like without departing from the scope of the instant application. The vehicle 202 could be a vehicle, server or any device with a processor and memory.

The processor 204 performs one or more of receiving a confirmation of an event from one or more elements described or depicted herein, wherein the confirmation comprises a blockchain consensus between peers represented by any of the elements 244E and executing a smart contract to record the confirmation on a blockchain-based on the blockchain consensus 246E. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer readable media 242E may fully or partially reside in the interior or exterior of the vehicles. The steps or features stored in the computer readable media 242E may be fully or partially performed by any of the processors and/or elements in any order. Additionally, one or more steps or features may be added, omitted, combined, performed at a later time, etc.

Figure 2E:
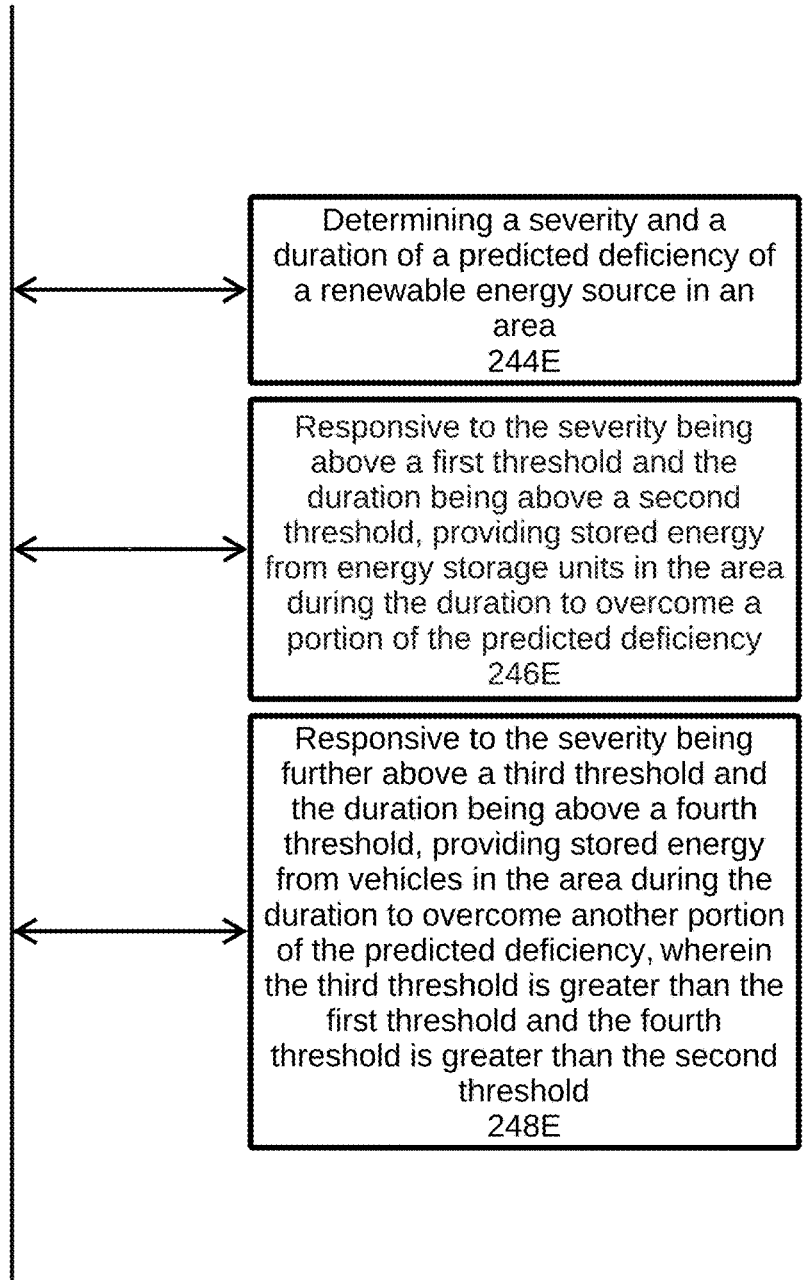
FIG. 2E illustrates a flow diagram, according to example embodiments.

FIG. 2E illustrates a flow diagram 300, according to example embodiments. Referring to FIG. 2E, the solution includes one or more of determining a severity and a duration of a predicted deficiency of a renewable energy source in an area 244E, responsive to the severity being above a first threshold and the duration being above a second threshold, providing stored energy from energy storage units in the area during the duration to overcome a portion of the predicted deficiency 246E, and responsive to the severity being further above a third threshold and the duration being above a fourth threshold, providing stored energy from vehicles in the area during the duration to overcome another portion of the predicted deficiency, wherein the third threshold is greater than the first threshold and the fourth threshold is greater than the second threshold 248E.

Figure 2F:
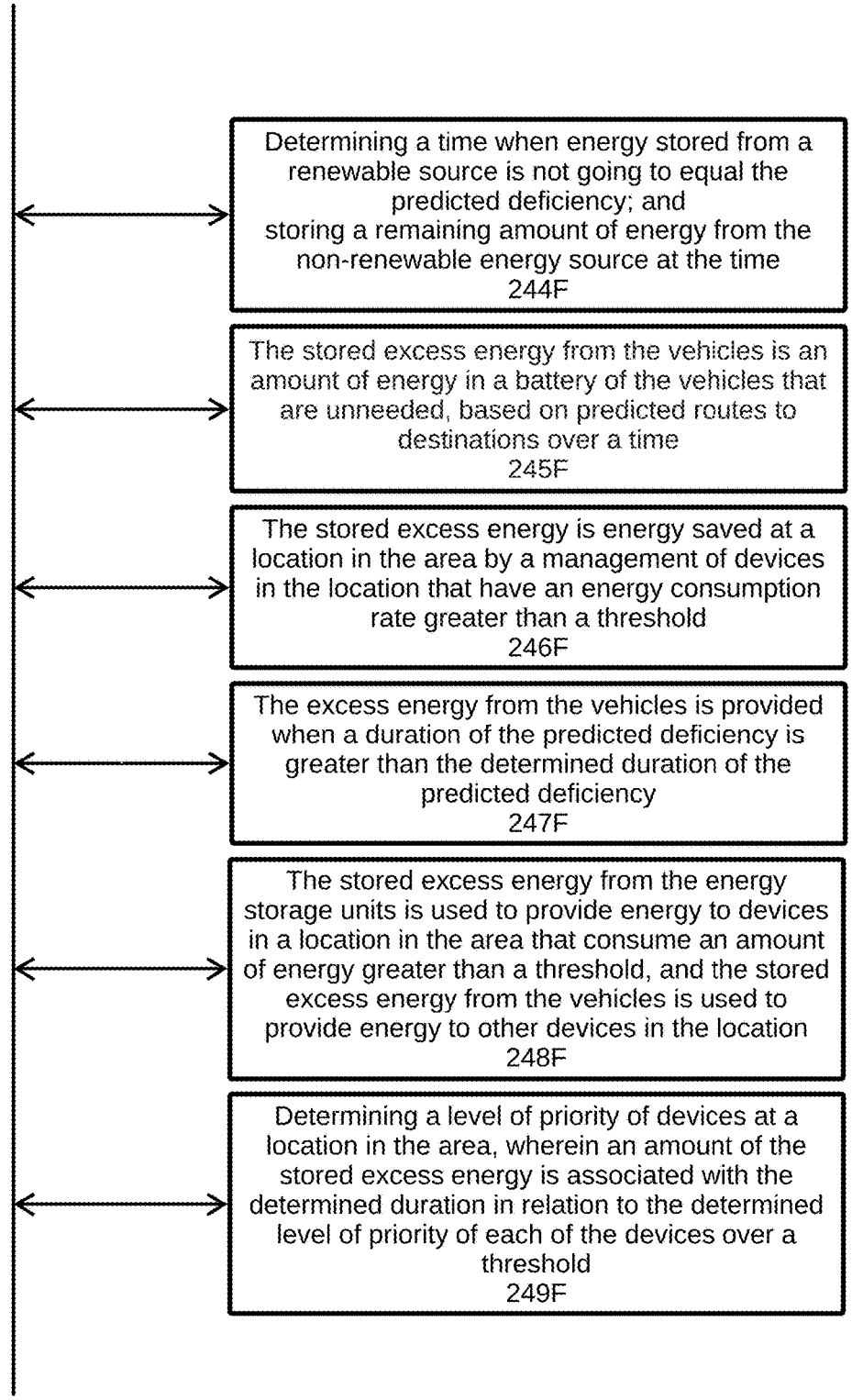
FIG. 2F illustrates another flow diagram, according to example embodiments.

FIG. 2F illustrates another flow diagram 320, according to example embodiments. Referring to FIG. 2F, the solution includes one or more of determining a time when energy stored from a renewable source is not going to equal the predicted deficiency; and storing a remaining amount of energy from the non-renewable energy source at the time 244F, the stored excess energy from the vehicles is an amount of energy in a battery of the vehicles that are unneeded, based on predicted routes to destinations over a time 245F, the stored excess energy is energy saved at a location in the area by a management of devices in the location that has an energy consumption rate greater than a threshold 246F, the excess energy from the vehicles is provided when a duration of the predicted deficiency is greater than the determined duration of the predicted deficiency 247F, the stored excess energy from the energy storage units is used to provide energy to devices in a location in the area that consumes an amount of energy greater than a threshold, and the stored excess energy from the vehicles is used to provide energy to other devices in the location 248F, and determining a level of priority of devices at a location in the area, wherein an amount of the stored excess energy is associated with the determined duration in relation to the determined level of priority of each of the devices over a threshold 249F.

Figure 3A:
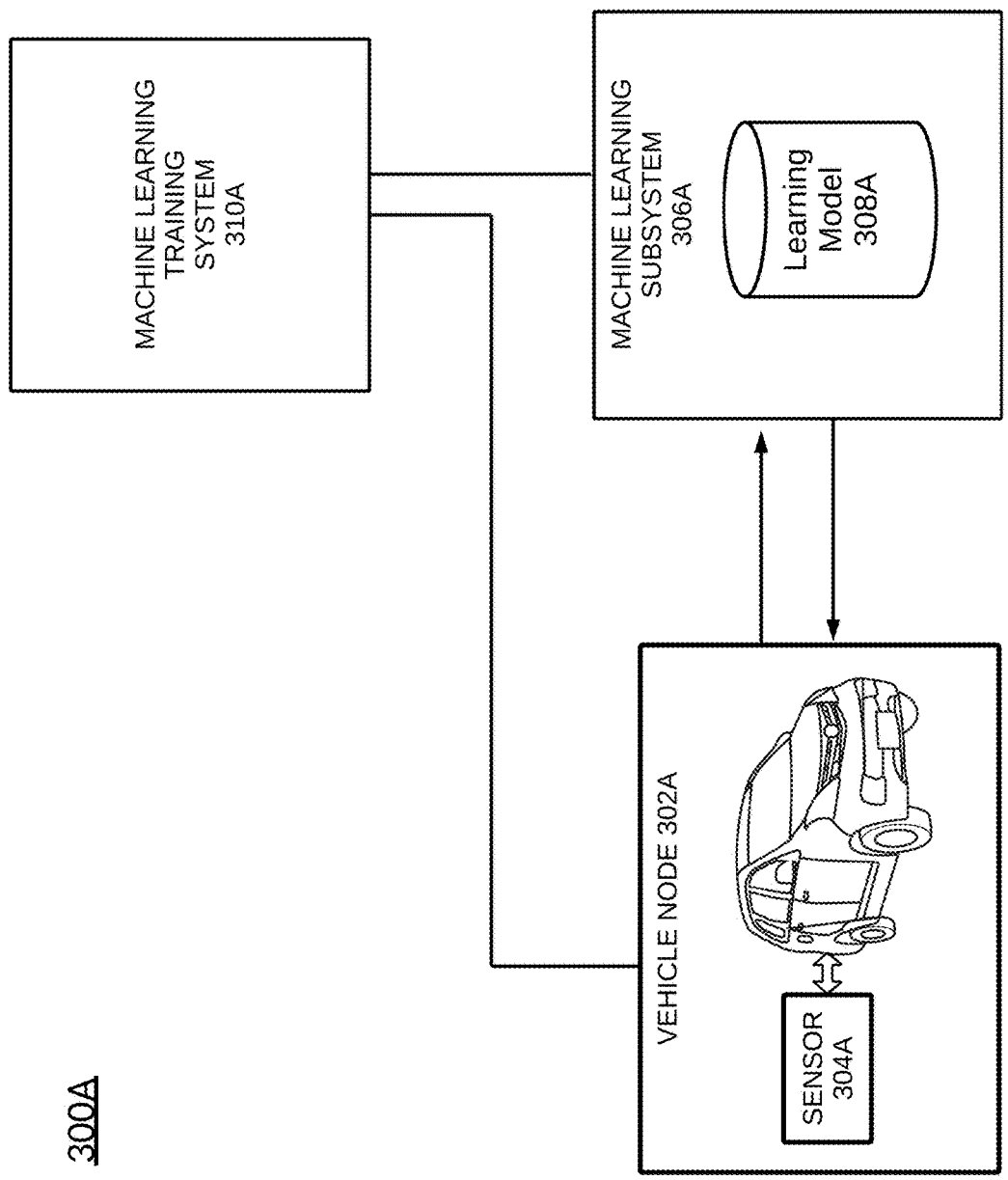
FIG. 3A illustrates a machine learning network diagram, according to example embodiments.

Referring now to FIG. 3A, a diagram depicting a machine learning vehicle network diagram 300A. The machine learning subsystem 306A contains a learning model 308A, which is an artifact created by a machine learning training system 310A that generates predictions by finding patterns in one or more training data sets. In some embodiments, the machine learning subsystem 306A resides in the vehicle node 302A. An artifact is used to describe an output created by a training process, such as a checkpoint, a file, or a model. In other embodiments, the machine learning subsystem 306A resides outside of the vehicle node 302A.

The vehicle 302A sends data from the one or more sensors 304A to the machine learning subsystem 306A. The machine learning subsystem 306A provides the one or more sensor 304A data to the learning model 308A, which returns one or more predictions. The machine learning subsystem 306A sends one or more instructions to the vehicle 302A based on the predictions from the learning model 308A.

In a further embodiment, the vehicle 302A may send the one or more sensor 304A data to the machine learning training system 310A. In yet another example, the machine learning subsystem 306A may send the sensor 304A data to the machine learning subsystem 306A. One or more of the applications, features, steps, solutions, etc., described and/or depicted herein may utilize the machine learning network 400 as described herein.

The example embodiments may communicate with a host platform 320, as shown in the examples of FIGS. 3B-3E. The system 300B may be hosted by or otherwise communicate with the host platform 320 shown in FIGS. 3B-3E. That is, the methods, systems, and processes described herein may interact with the processes and systems that are shown in the examples shown and described in FIGS. 3B-3E.

Figure 3B:
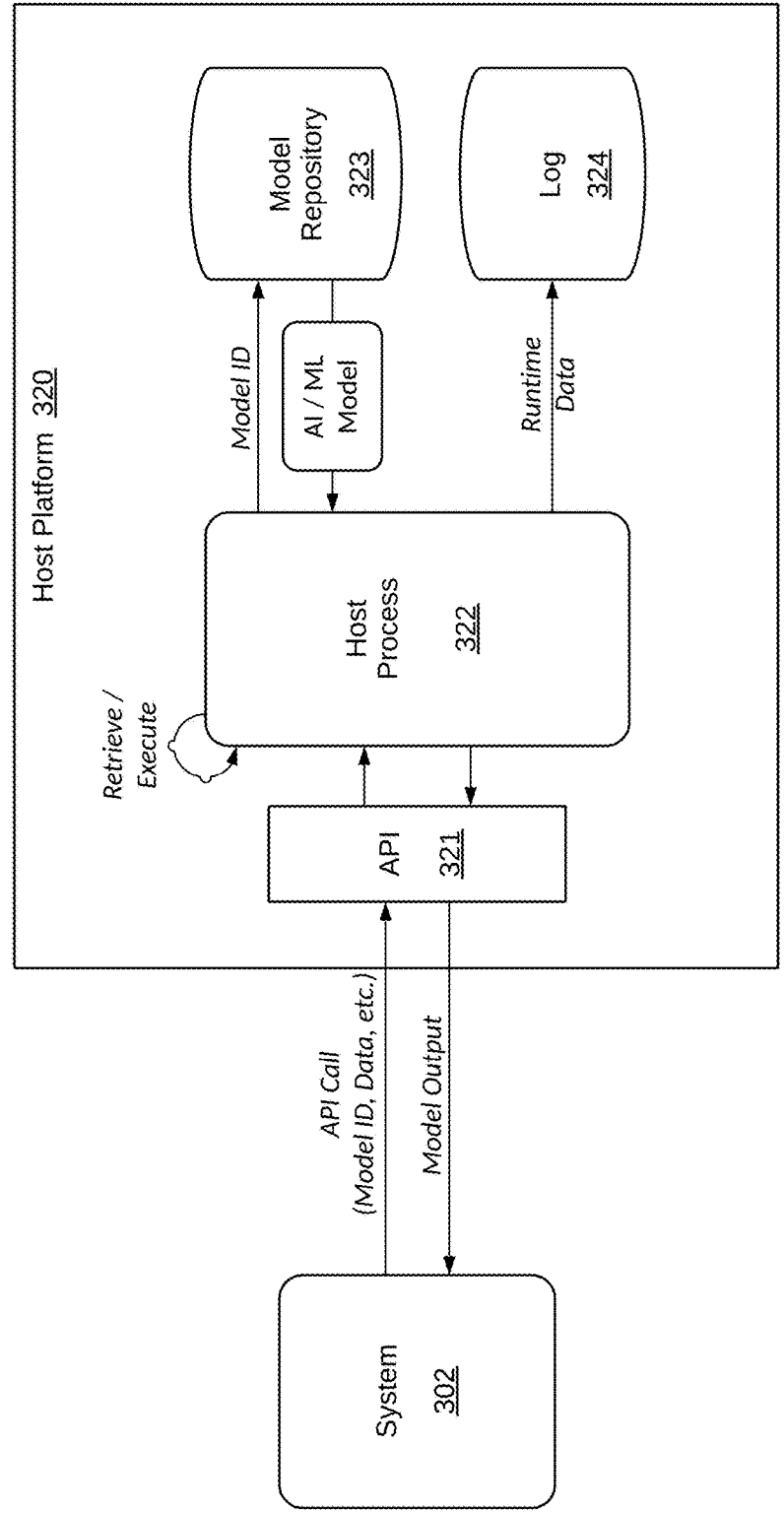
FIG. 3B illustrates another machine learning network diagram, according to example embodiments.

For example, FIG. 3B illustrates a process 300B of executing a machine learning model via the host platform 320. The host platform 320 may host a process 322 within a live runtime environment that is accessible to other software programs, applications, and the like, via a network such as the Internet. Here, the host process 322 may have a URL, endpoint, API, etc., which is publicly available on the Internet.

In this example, the host process 322 may control access to and execution of models that are stored within a model repository 323. For example, the models may include artificial intelligence (AI) models, machine learning models, neural networks, or the like. The system 300B may trigger the execution of a model from the model repository 323 via submission of a call to an application programming interface (API) 321 of the host process 322. The request may include an identifier of a model or models to be executed, a payload of data (e.g., to be input to the model during execution), and the like. The host process 322 may receive the call from the system 300B and retrieve the corresponding model from the model repository 323, deploy the model within a live runtime environment, execute the model on the input data, and return a result of the execution to the system 302. The result of the execution may include an output result from the execution of the model.

In some embodiments, the system 300B may provide feedback from the output provided by the model. For example, a user may input a confirmation that the prediction output by the model is correct or provide a notification that the model is incorrect. This information may be added to the results of execution and stored within a log 324. The log data may include an identifier of the input, an identifier of the output, an identifier of the model used, and feedback from the recipient. This information may be used to subsequently retrain the model, for example, using the model development environment shown in the example of FIG. 3C.

In one embodiment, the host process 322 may include Generative AI (GenAI), which may be used by the instant solution in the transformation of data. Vehicles may be equipped with diverse sensors, cameras, radars, and LIDARs, which collect a vast array of data, such as images, speed readings, GPS data, and acceleration metrics. However, raw data, once acquired, undergoes preprocessing that may involve normalization, anonymization, missing value imputation, or noise reduction to allow the data to be further used effectively.

The GenAI may execute data augmentation following the preprocessing of the data. Due to the limitation of datasets in capturing the vast complexity of real-world vehicle scenarios, augmentation tools are employed to expand the dataset. This might involve image-specific transformations like rotations, translations, or brightness adjustments. For non-image data, techniques like jittering can be used to introduce synthetic noise, simulating a broader set of conditions.

In the instant solution, data generation may be then performed on the data. Tools like Generative Adversarial Networks (GANs) and Variational Autoencoders (VAEs) are trained on existing datasets to generate new, plausible data samples. For example, GANs might be tasked with crafting images showcasing vehicles in uncharted conditions or from unique perspectives. As another example, the synthesis of sensor data may be performed to model and create synthetic readings for such scenarios, enabling thorough system testing without actual physical encounters.

A critical step in the use of GenAI, given the safety-critical nature of vehicles, is validation. This validation might include the output data being compared with real-world datasets or using specialized tools like a GAN's discriminator to gauge the realism of the crafted samples.

Figure 3C:
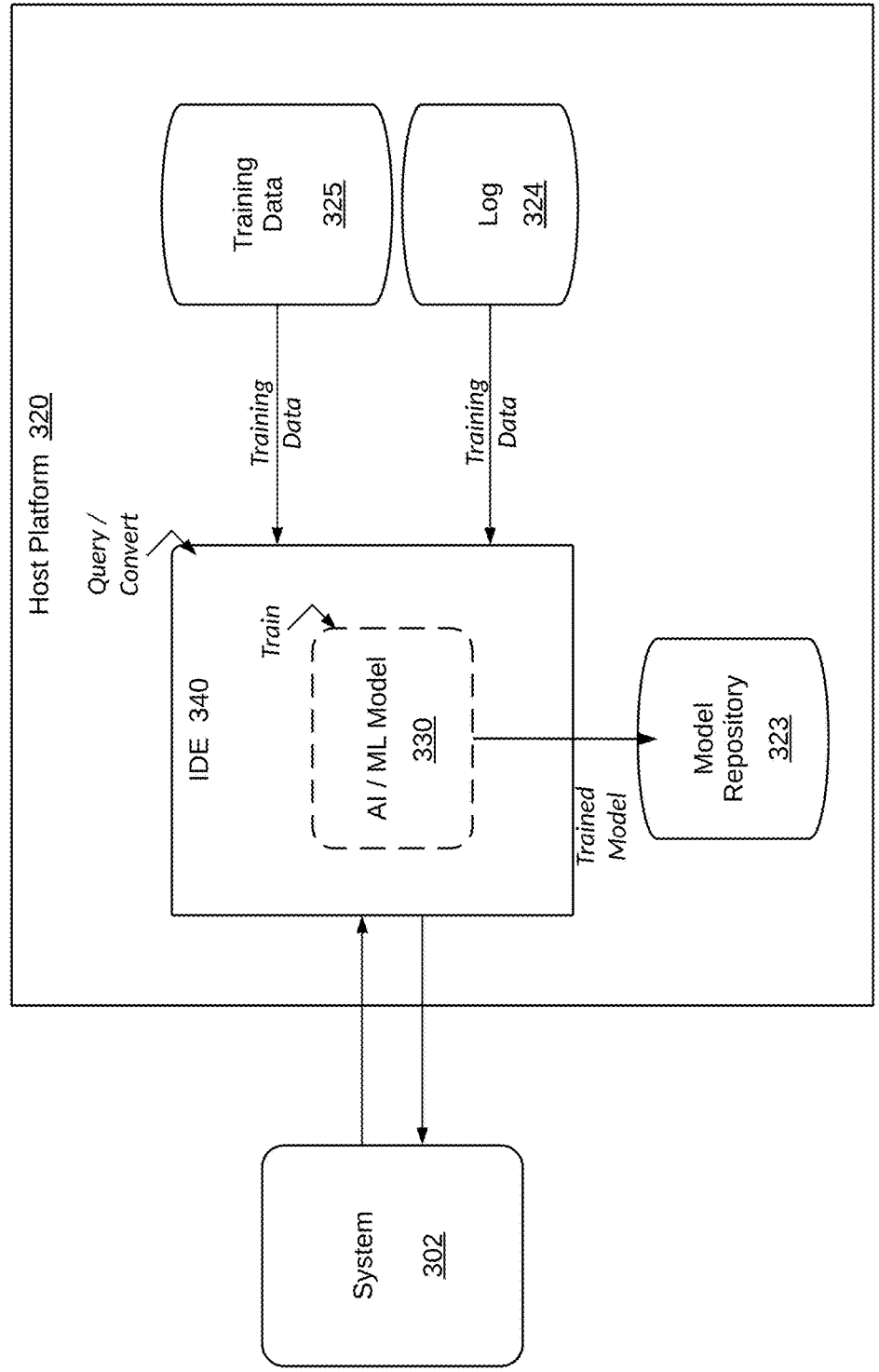
FIG. 3C illustrates yet another machine learning network diagram, according to example embodiments.

FIG. 3C illustrates a process 300C of training a machine learning model 330 according to example embodiments. Referring to FIG. 3C, the host platform 320 may host an integrated development environment (IDE) 340 where machine learning models, AI models, and the like may be developed, trained, retrained, and the like. In this example, the IDE 340 may include a software application with a user interface accessible by the system 302. For example, the IDE 340 may be embodied as a web application that can be accessed by a device at a network address, URL, etc. As another example, the IDE 340 may be locally or remotely installed on a computing device used by a user.

The system 300C may be used to design a model (via a user interface of the IDE), such as a machine learning model, etc. The model can then be executed/trained based on the training data established via the user interface. For example, the user interface may be used to build a new model. The training data for training such a new model may be provided from a training data store 325, which includes training samples from the web, from customers, and the like. Here, the model is executed on the training data via the host platform 320 to generate a result. The execution of the model causes the model to learn based on the input training data. When the model is fully trained, it may be stored within the model repository 323 via the IDE 340, or the like.

As another example, the IDE 340 may be used to retrain an existing model. Here, the training process may use executional results previously generated/output by the model 330 (including any feedback, etc.) to retrain the model 330. For example, predicted outputs that are identified as accurate, best, good, etc., may be distinguished from outputs that are inaccurate, incorrect, bad, etc. One or more of these types of outputs can be identified and used for retraining the model to help the model provide better outputs.

Figure 3D:
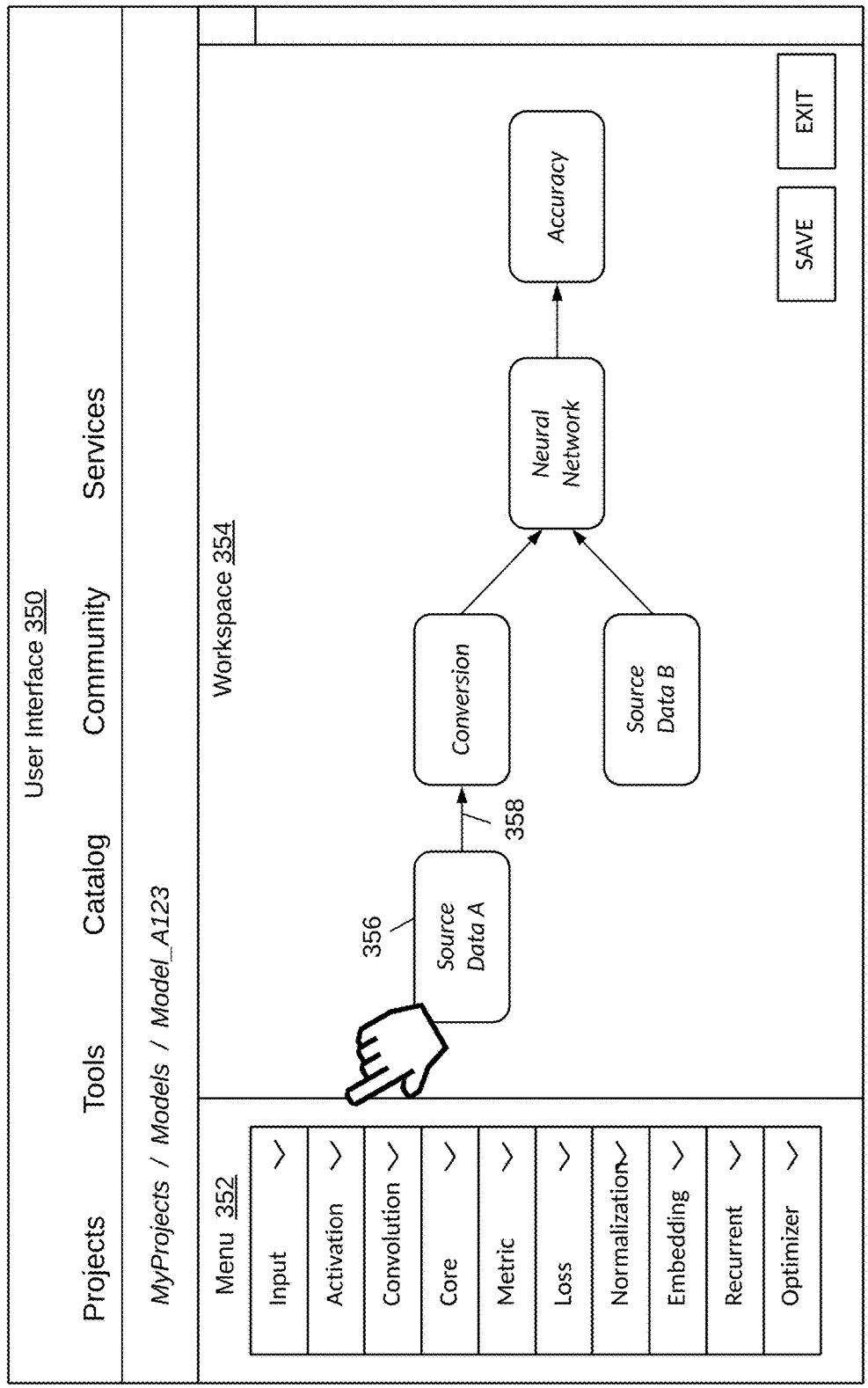
FIG. 3D illustrates a further machine learning network diagram, according to example embodiments.

FIG. 3D illustrates a process 300D of designing a new machine learning model via a user interface of the system 300B according to example embodiments. As an example, the system 300B may be output as part of the software application 330, which interacts with the IDE 340 shown in FIG. 3C, however, embodiments are not limited thereto. Referring to FIG. 3D, a user can use an input mechanism from a menu 352 of a user interface 350 to add pieces/components to a model being developed within a workspace 354 of the user interface 350.

In the example of FIG. 3D the menu 352 includes a plurality of graphical user interface (GUI) menu options which can be selected to drill down into additional components that can be added to the model design shown in the workspace 354. Here, the GUI menu includes options for adding features such as neural networks, machine learning models, AI models, data sources, conversion processes (e.g., vectorization, encoding, etc.), analytics, etc. The user can continue to add features to the model and connect them using edges or other means to create a flow within the workspace 354. For example, the user may add a node 356 to a diagram of a new model within the workspace 354. For example, the user may connect the node 356 to another node in the diagram via an edge 358, creating a dependency within the diagram. When the user is done, the user can save the model for subsequent training/testing.

In another example, the name of the object can be identified from a web page or a user interface 350 where the object is visible within a browser or the workspace 354 on the user device. A pop-up within the browser or the workspace 354 can be overlayed where the object is visible, which includes an option to navigate to the identified web page corresponding to the alternative object via a rule set.

Figure 3E:
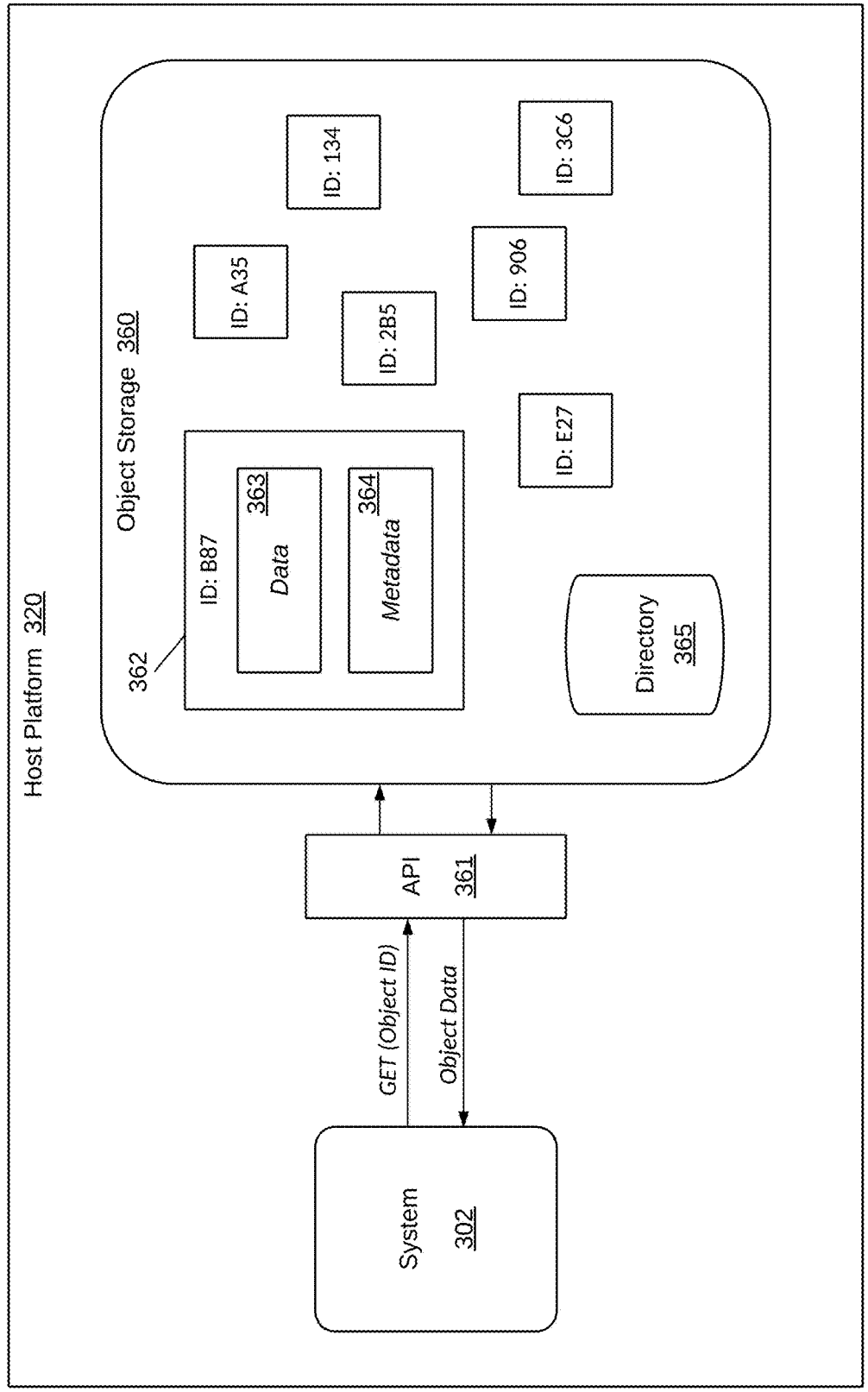
FIG. 3E illustrates a machine learning network diagram, according to example embodiments.

FIG. 3E illustrates a process 300E of accessing an object 362 from an object storage 360 of the host platform 320 according to example embodiments. For example, the object storage 360 may store data that is used by the AI models and machine learning (ML) models 330, training data, expected outputs for testing, training results, and the like. The object storage 360 may also store any other kind of data. Each object may include a unique identifier, a data section 363, and a metadata section 364, which provides a descriptive context associated with the data, including data that can later be extracted for purposes of machine learning. The unique identifier may uniquely identify an object with respect to all other objects in the object storage 360. The data section 363 may include unstructured data such as web pages, digital content, images, audio, text, and the like.

Instead of breaking files into blocks stored on disks in a file system, the object storage 360 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application 300C can use to locate and access it. In this case, the metadata is more descriptive than a file-based approach. The metadata can be customized with additional context that can later be extracted and leveraged for other purposes, such as data analytics.

The objects that are stored in the object storage 360 may be accessed via an application programming interface (API) 361. The API 361 may be a Hypertext Transfer Protocol (HTTP)-based RESTful API (also known as a RESTful Web service). The API 361 can be used by the client application 300C to query an object's metadata to locate the desired object (data) via the Internet from anywhere on any device. The API 361 may use HTTP commands such as "PUT" or "POST" to upload an object, "GET" to retrieve an object, "DELETE" to remove an object, and the like.

The object storage 360 may provide a directory 365 that uses the metadata of the objects to locate appropriate data files. The directory 365 may contain descriptive information about each object stored in the object storage 360, such as a name, a unique identifier, a creation timestamp, a collection name, etc. To query the object within the object storage 360, the client application 300C may submit a command, such as an HTTP command, with an identifier of the object 362, a payload, etc. The object storage 360 can store the actions and results described herein, including associating two or more lists of ranked assets with one another based on variables used by the two or more lists of ranked assets that have a correlation above a predetermined threshold.

Figure 4A:
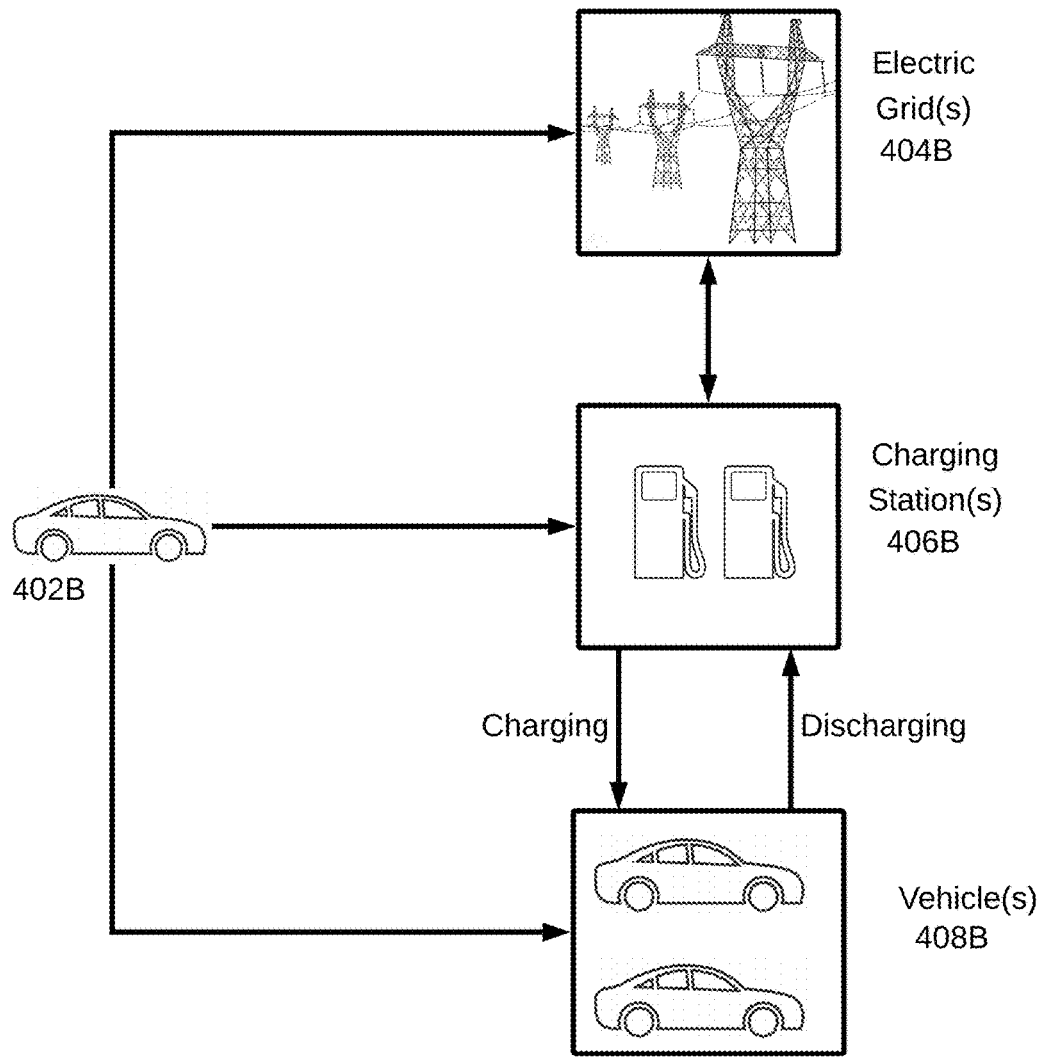
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via Vehicle to Vehicle (V2V) technology, communication over cellular, WiFi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein. Further, the safety and efficiency of the vehicle may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated on-the-fly during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/308B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can take energy from the vehicle and "push" the energy back into the grid 404B, otherwise referred to as "V2G". In bidirectional charging, the electricity flows both ways; to the vehicle and from the vehicle. When a vehicle is charged, alternating current (AC) electricity from the grid 404B is converted to direct current (DC). This may be performed by one or more of the vehicle's own converter or a converter on the charger 406B. The energy stored in the vehicle's batteries may be sent in an opposite direction back to the grid. The energy is converted from DC to AC through a converter usually located in the charger 406B, otherwise referred to as a bidirectional charger. Further, the instant solution as described and depicted with respect to FIG. 3B can be utilized in this and other networks and/or systems.

Figure 4B:
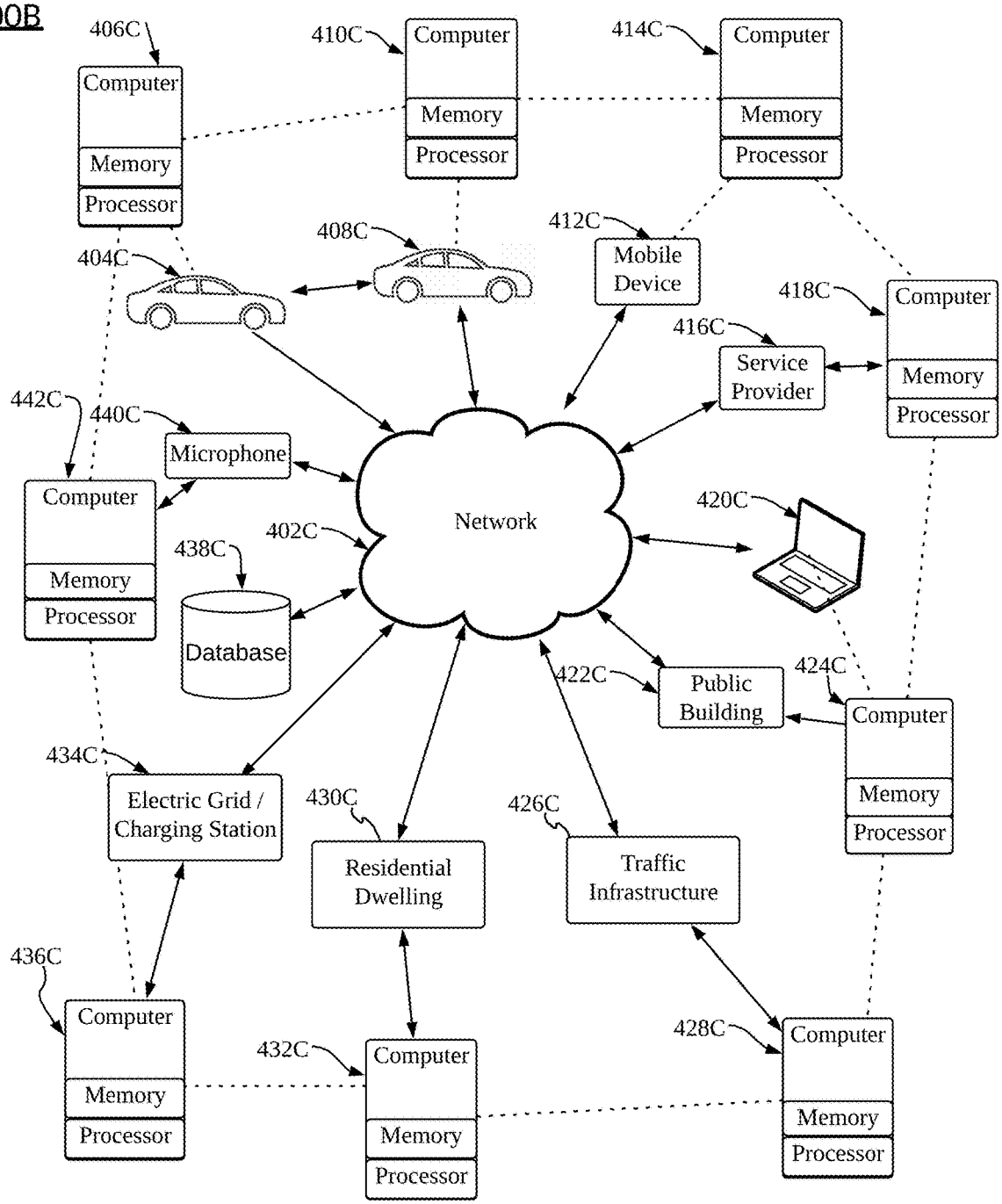
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C, 440C and 410C associated with various entities, all communicably coupled and in communication with a network 402C. A database 440C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, 440C, and 410C. The one or more public buildings 422C may include various agencies. The one or more public buildings 422C may utilize a computing device 424C. The one or more service provider 416C may include a dealership, a tow truck service, a collision center or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be selfmaneuvering and navigate without human input. An autonomous vehicle may have and use one or more sensors and/or a navigation unit to drive autonomously. All of the data described or depicted herein can be stored, analyzed, processed and/or forwarded by one or more of the elements in FIG. 4B.

Figure 4C:
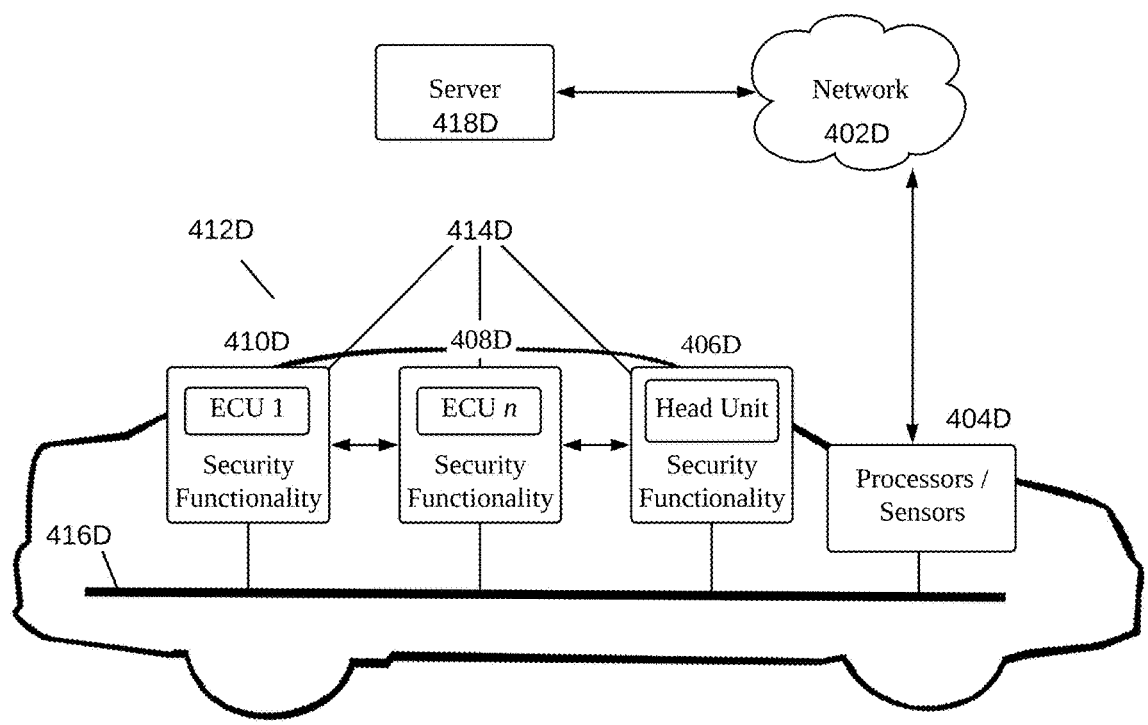
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An Electrical Control Unit (ECU) is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's Controller Area Network (CAN Bus). When an ECU encounters a process that is unauthorized, that ECU can block the process from operating. Automotive ECUs can use different contexts to determine whether a process is operating within its permitted bounds, such as proximity contexts such as nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
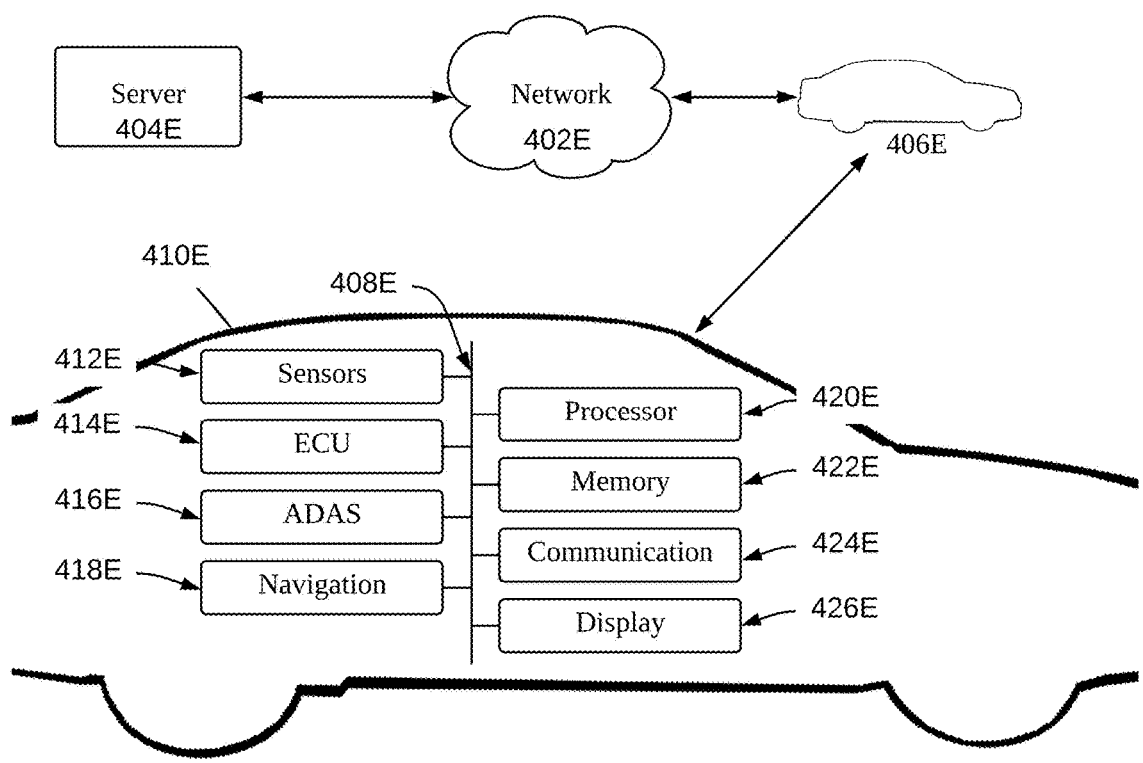
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a Controller Area Network (CAN) bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a CD-ROM device, a DVD-ROM device, a DVD-RAM device, a DVD-RW device, a flash memory device, or some other mass storage device for storing information on a permanent basis. A portion of the memory 422E may be reserved for use as a buffer or virtual random-access memory (virtual RAM). The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a Lidar sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a GPS sensor, a mapping functionality, and any other type of automotive sensor. The navigation system 418E may store the sensor data in the memory 422E.

The communication unit 424E transmits and receives data to and from the network 420E or to another communication channel. In some embodiments, the communication unit 424E may include a DSRC transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas as areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

Electronic Control Units (ECUs) are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as advanced driver-assistance systems (ADAS), sensors, and the like. While these new technologies have helped improve the safety and driving experience of a vehicle, they have also increased the number of externally-communicating units inside of the vehicle, making them more vulnerable to attack. Below are some examples of protecting the vehicle from physical intrusion and remote intrusion.

In one embodiment, a CAN includes a CAN bus with a high and low terminal and a plurality of electronic control units (ECUs), which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and also convert data from the CAN bus into a format for the microcontroller. Meanwhile, the microcontroller interprets the messages and also decide what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
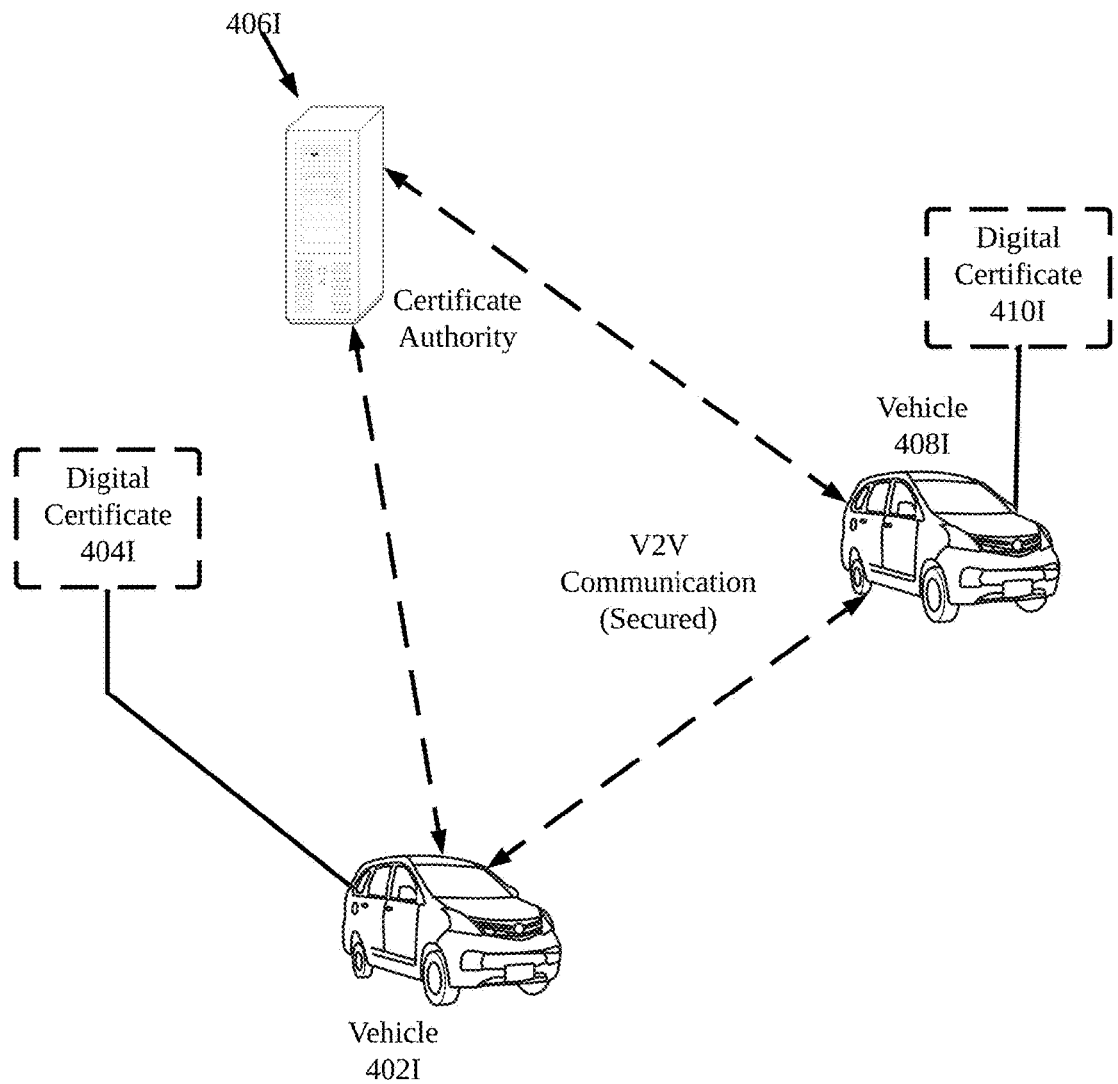
FIG. 4E illustrates yet a further diagram depicting an example of vehicles performing secured V2V communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module 308J may provide information for authenticating communications between the ECUS. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
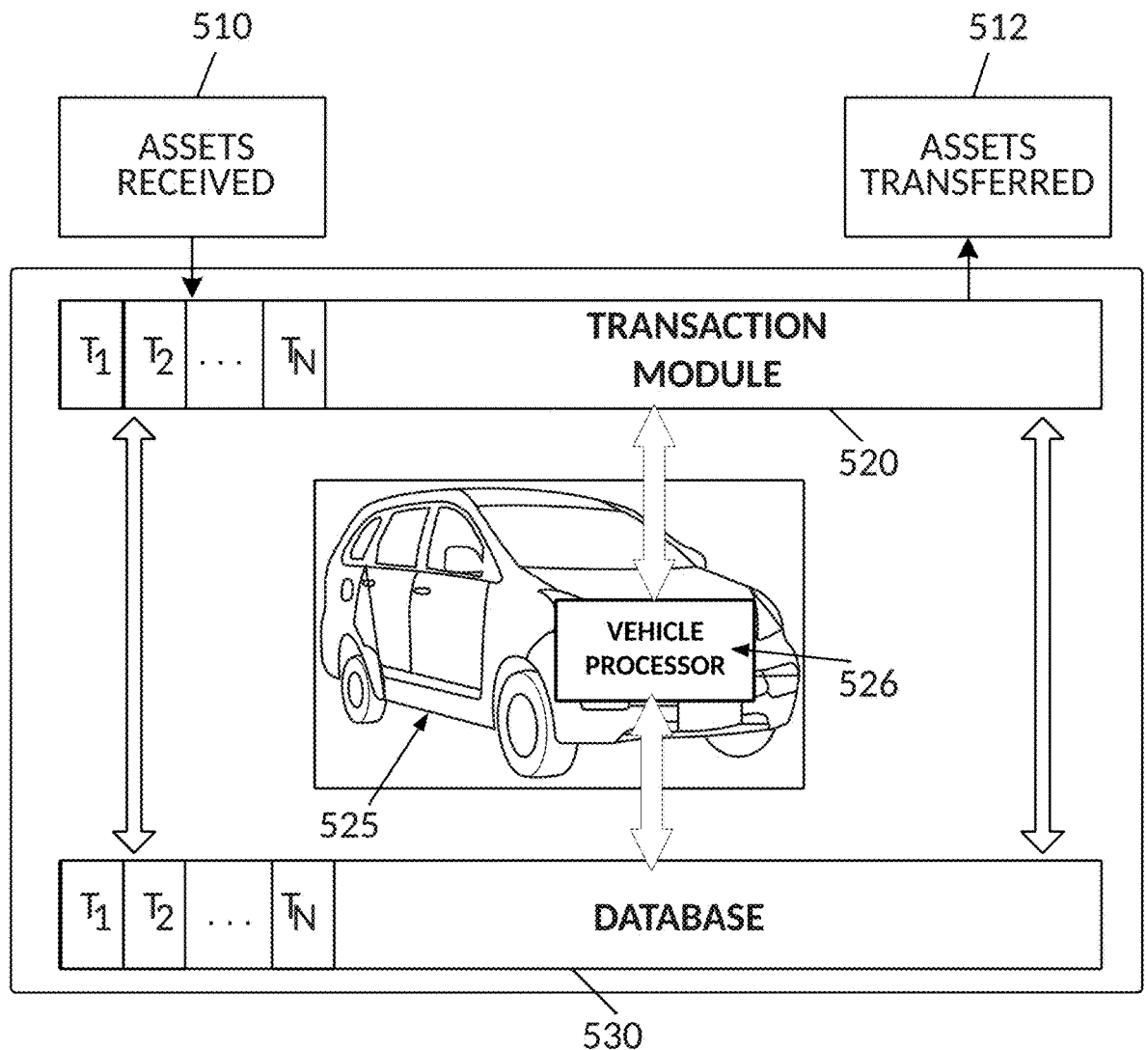
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525 is engaged in transactions (e.g., vehicle service, dealer transactions, delivery/pickup, transportation services, etc.), the vehicle may receive assets 510 and/or expel/transfer assets 512 according to a transaction(s). A vehicle processor 526 resides in the vehicle 525 and communication exists between the vehicle processor 526, a database 530, a vehicle processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the vehicle, may be off-board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in the another vehicle and communication exists between the vehicle processor, a second database, the vehicle processor and a transaction module. The another vehicle may then receive the information via a wireless communication request to perform the package pickup from the vehicle and/or from a server (not shown). The transactions are logged in the transaction modules and of both vehicles. The credits are transferred from vehicle to the another vehicle and the record of the transferred service is logged in the first and databases, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off-board the vehicle, may be accessible directly and/or through a network.

Figure 5B:
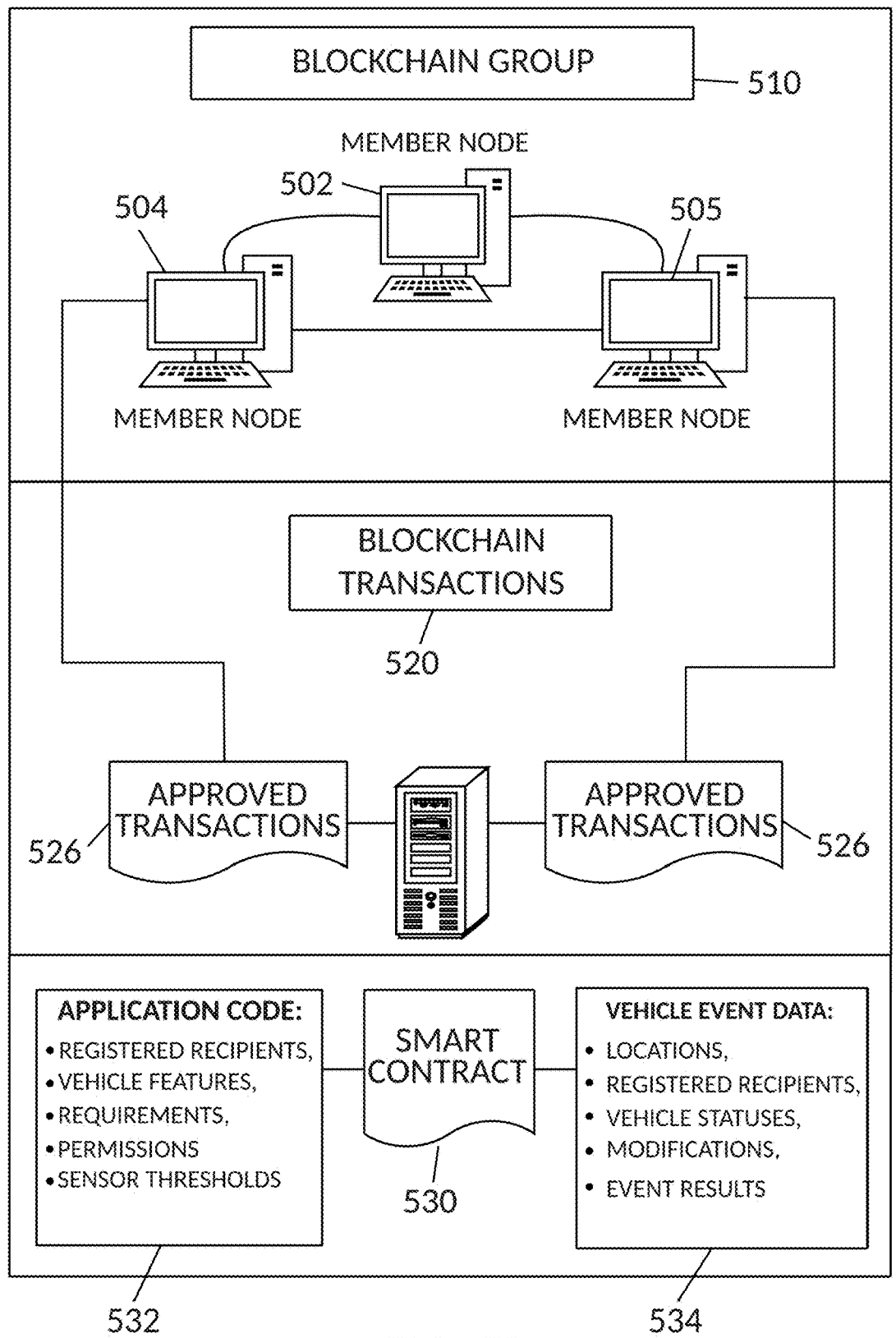
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502-506 as part of a blockchain group 510. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520 are stored in memory of computers as the transactions are received and approved by the consensus model dictated by the members' nodes. Approved transactions 526 are stored in current blocks of the blockchain and committed to the blockchain via a committal procedure, which includes performing a hash of the data contents of the transactions in a current block and referencing a previous hash of a previous block. Within the blockchain, one or more smart contracts 530 may exist that define the terms of transaction agreements and actions included in smart contract executable application code 532, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
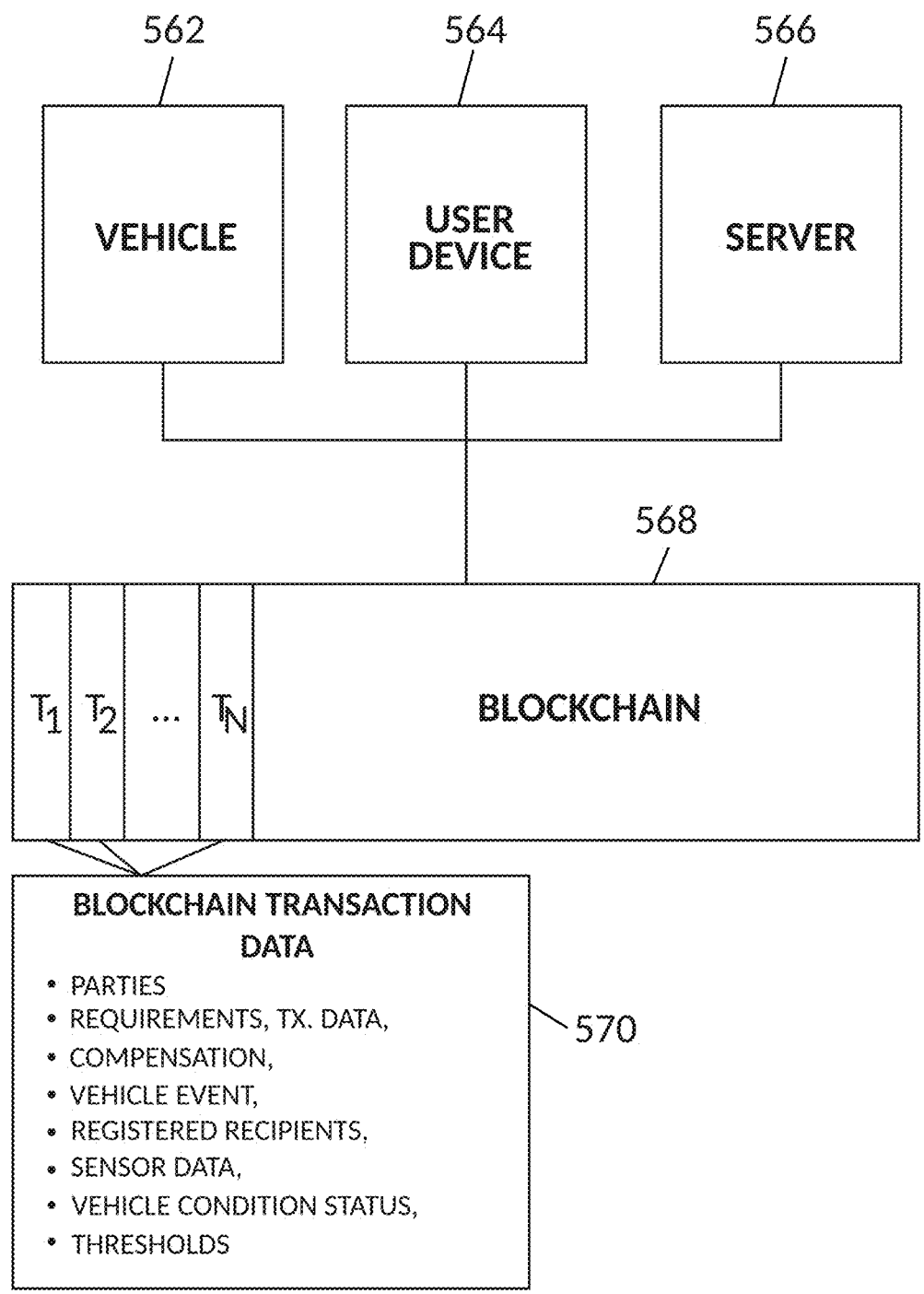
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562, the user device 564 and a server 566 sharing information with a distributed ledger (i.e., blockchain) 568. The server may represent a service provider entity inquiring with a vehicle service provider to share user profile rating information in the event that a known and established user profile is attempting to rent a vehicle with an established rated profile. The server 566 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
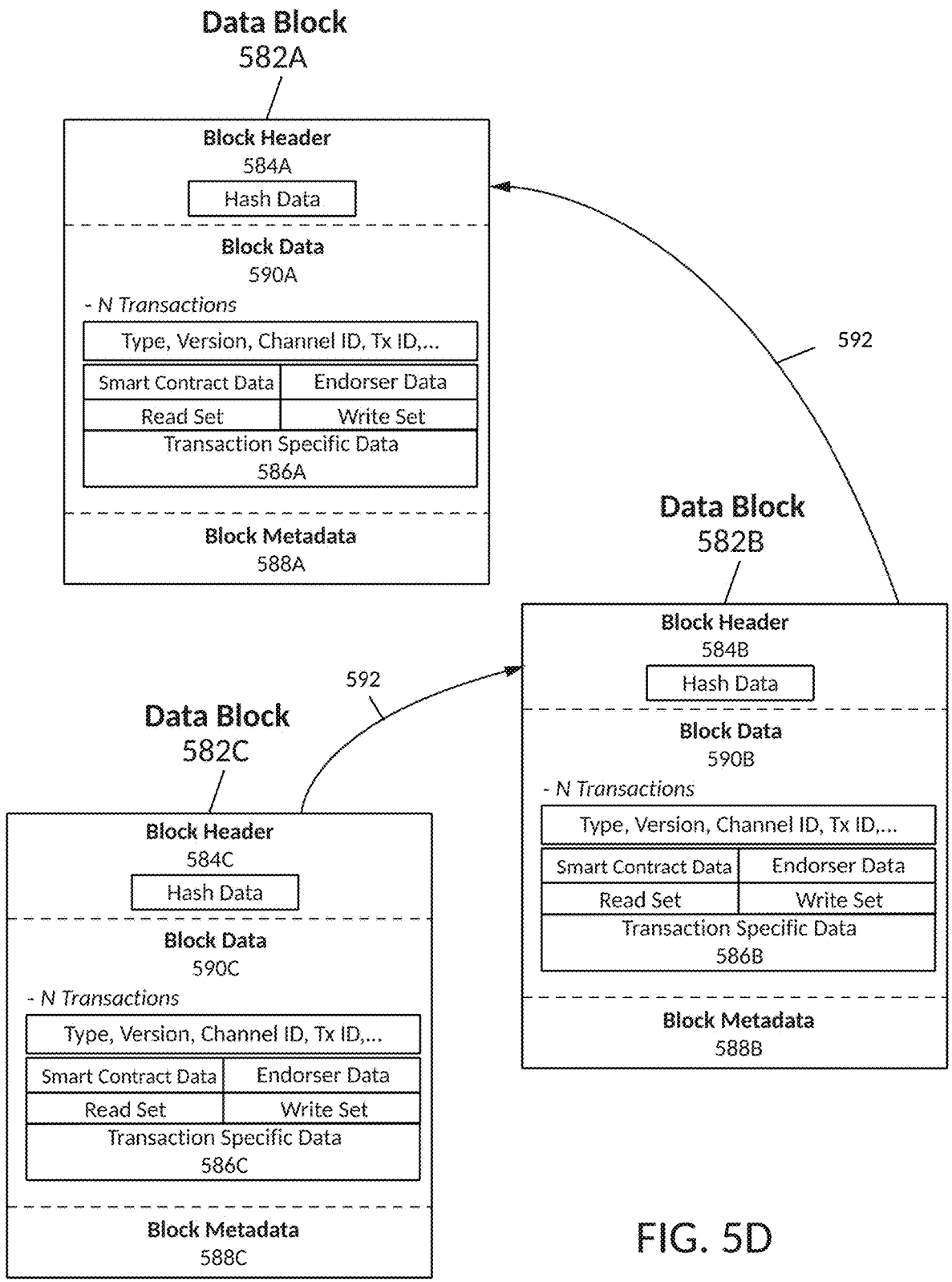
FIG. 5D illustrates an example data block interaction, according to example embodiments.

FIG. 5D illustrates blockchain blocks 580 that can be added to a distributed ledger, according to example embodiments, and contents of block structures 582A to 582*n*. Referring to FIG. 5D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584*n*, transaction-specific data 586A to 586*n*, and block metadata 588A to 588*n*. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data; however, this is not a requirement. The block 582A may store transactional information of N entries (e.g., 100, 500, 1000, 2000, 3000, etc.) within the block data 590A to 590*n*. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 510A and a validation code identifying whether an entry was valid/invalid.

The other blocks 582B to 582*n* in the blockchain also have headers, files, and values. However, unlike the first block 582A, each of the headers 584A to 584*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

The above embodiments may be implemented in hardware, in a computer program executed by a processor, in firmware, or in a combination of the above. A computer program may be embodied on a computer readable media, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
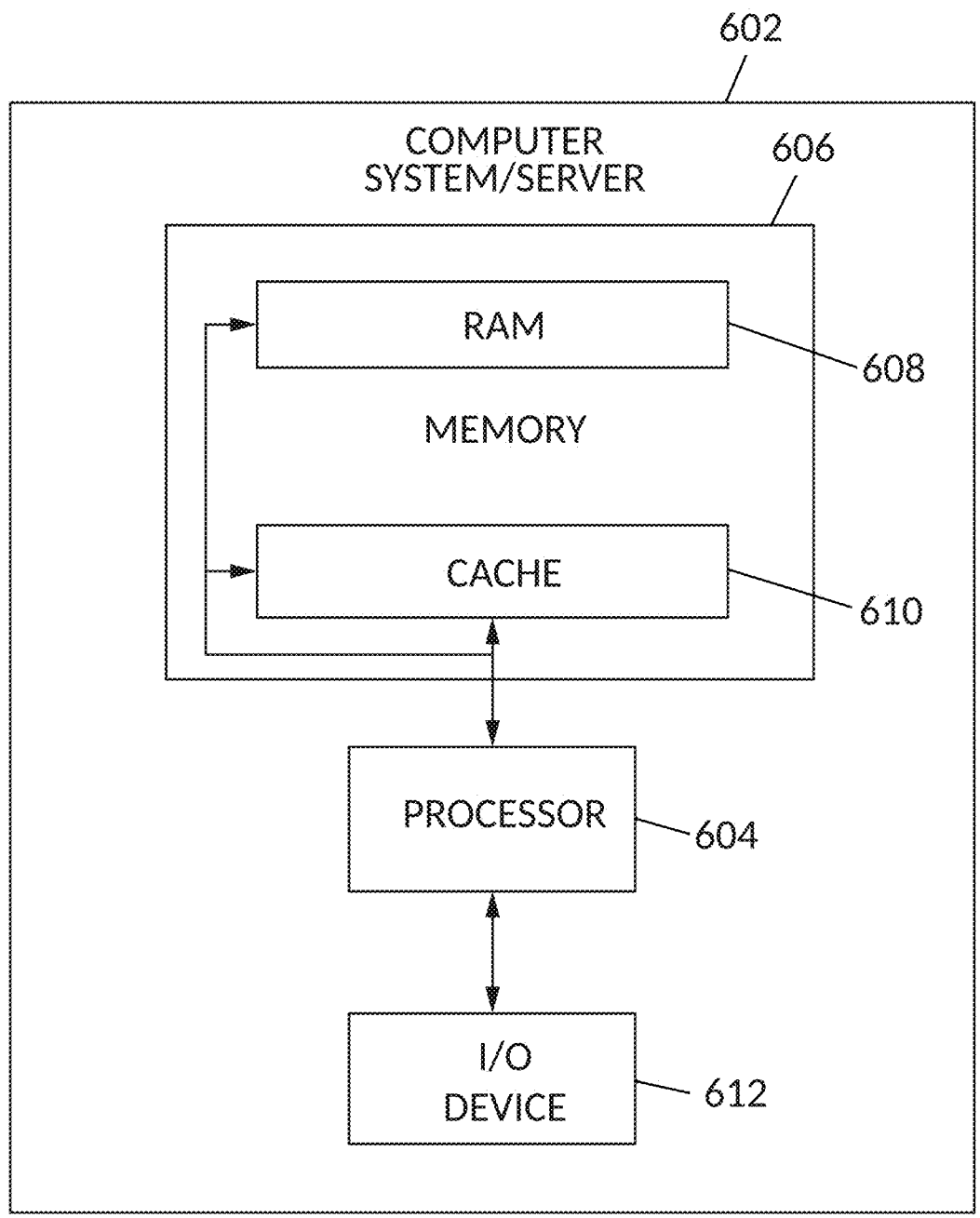
FIG. 6 illustrates an example system that supports one or more of the example embodiments.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 5E:
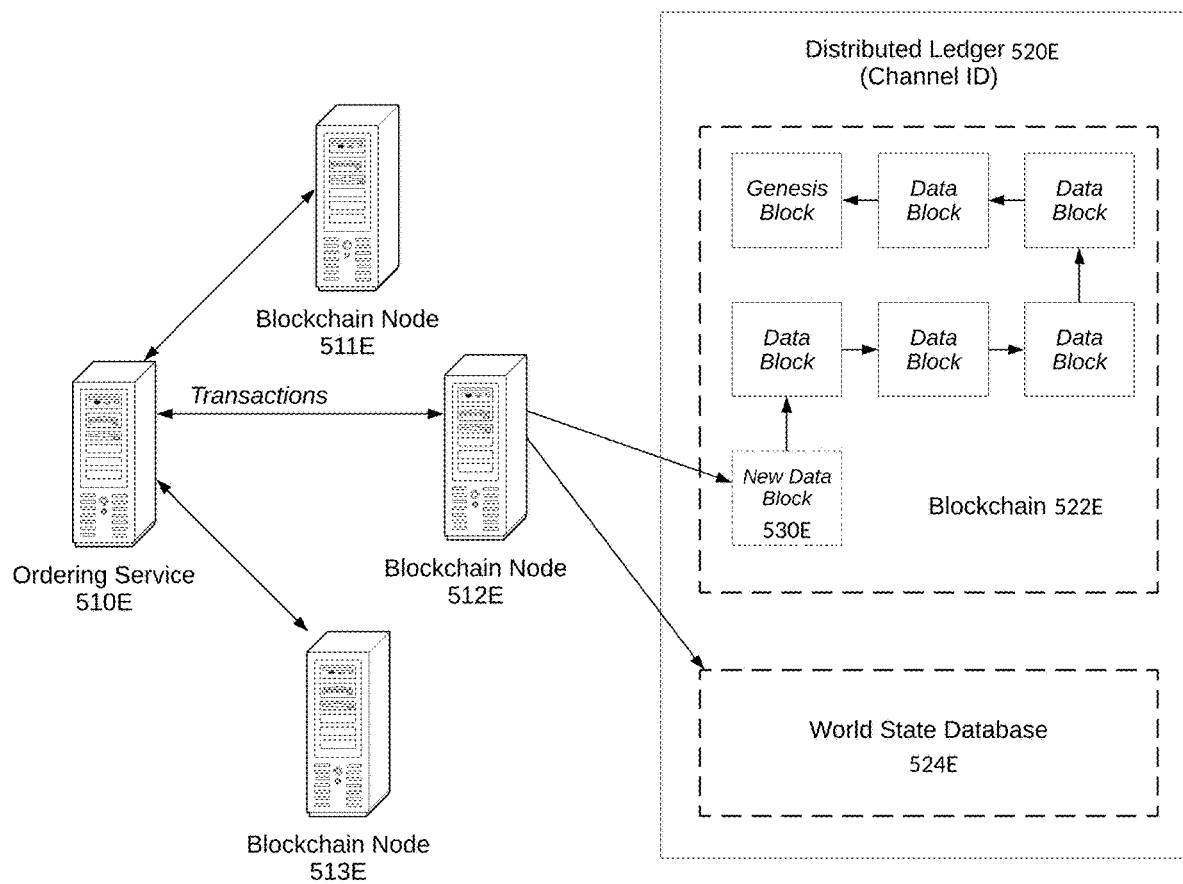
FIG. 5E illustrates a blockchain network diagram, according to example embodiments.

FIG. 5E illustrates a process 500E of a new block being added to a distributed ledger 520E, according to example embodiments, and FIG. 5B illustrates contents of a new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 520E. As an example, clients may be applications that act on behalf of a requester, such as a device, person or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 522E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, it can therefore be regenerated from the chain at any time. The state database 524E may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data new data block 530E for storage on blockchain 520E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 520E. The architecture of the blockchain network may be designed such that the specific implementation of 'ordering' (e.g., Solo, Kafka, BFT, etc.) becomes a pluggable component.

Transactions are written to the distributed ledger 520E in a consistent order. The order of transactions is established to ensure that the updates to the state database 524E are valid when they are committed to the network. Unlike a cryptocurrency blockchain system (e.g., Bitcoin, etc.) where ordering occurs through the solving of a cryptographic puzzle, or mining, in this example the parties of the distributed ledger 520E may choose the ordering mechanism that best suits that network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
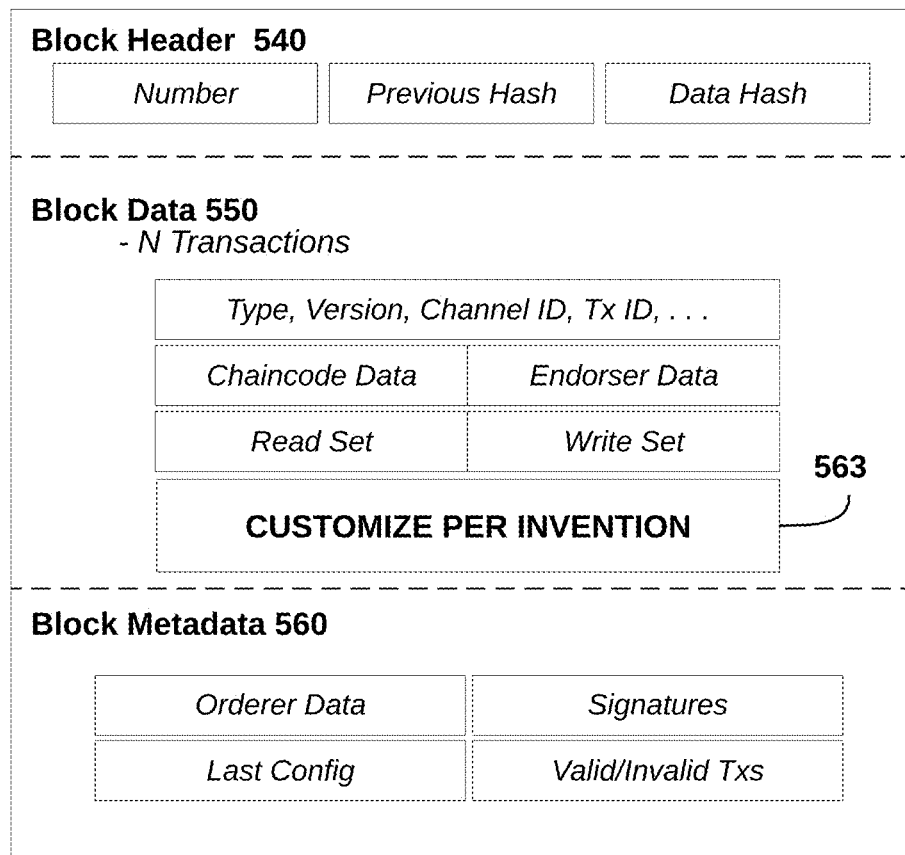
FIG. 5F illustrates an example new data block, according to example embodiments.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents, shown in FIG. 5F are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

Block 563 may contain code, that when executed by the processor performs: determining a severity and a duration of a predicted deficiency of a renewable energy source in an area, responsive to the severity being above a first threshold and the duration being above a second threshold, providing stored energy from energy storage units in the area during the duration to overcome a portion of the predicted deficiency, and responsive to the severity being further above a third threshold and the duration being above a fourth threshold, providing stored energy from vehicles in the area during the duration to overcome another portion of the predicted deficiency, wherein the third threshold is greater than the first threshold, and the fourth threshold is greater than the second threshold.

Although in FIG. 5F the blockchain data 563 is depicted in the block data 550 but could also be located in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E. Meanwhile, a committer of the block (such as blockchain node 512E) may add validity/invalidity information based on an endorsement policy, verification of read/write sets, and the like. The transaction filter may include a byte array of a size equal to the number of transactions in the block data 500D and a validation code identifying whether a transaction was valid/invalid.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one example, implements the flow diagrams of the other figures. The system memory 606 can include computer system readable media in the form of volatile memory, such as random-access memory (RAM) 608 and/or cache memory 610. Computer system/server 602 may further include other removable/non-removable, volatile/non-volatile computer system storage media. By way of example only, memory 606 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable media (s) having computer readable program code embodied thereon.

Computer system/server 602 may also communicate with one or more external devices via an I/O device 612 (such as an I/O adapter), which may include a keyboard, a pointing device, a display, a voice recognition module, etc., one or more devices that enable a user to interact with computer system/server 602, and/or any devices (e.g., network card, modem, etc.) that enable computer system/server 602 to communicate with one or more other computing devices. Such communication can occur via I/O interfaces of the device 612. Still yet, computer system/server 602 can communicate with one or more networks such as a local area network (LAN), a general wide area network (WAN), and/or a public network (e.g., the Internet) via a network adapter. As depicted, device 612 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable media has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method implemented by a processor, the method comprising:
   receiving a notification of a predicted deficiency of a renewable energy source for a location, the notification comprising comprises-a predicted severity and a predicted duration;
   responsive to the predicted severity exceeding a first threshold and the predicted duration exceeding a second threshold, provisioning an initial amount of energy solely to a critical device at the location from an energy storage unit at the location; and
   responsive to the predicted severity exceeding a third threshold, greater than the first threshold, and the predicted duration exceeding a fourth threshold, greater than the second threshold, provisioning a second amount of energy solely to a non-critical device at the location from a vehicle proximate to the location.

2. The method of claim 1, comprising:
   determining a time when renewable energy stored by the energy storage unit will not be sufficient to meet the predicted deficiency; and
   at the time, storing a remaining amount of energy from a non-renewable energy source.

3. The method of claim 1, wherein the second amount of energy is excess energy of the vehicle.

4. The method of claim 1, comprising:
   monitoring an energy consumption rate of the critical device and the non-critical device.

5. The method of claim 1, wherein the provisioning of the second amount of energy further comprises:
   providing the second amount of energy in response to detecting that a duration of the predicted deficiency is greater than the predicted duration of the predicted deficiency.

6. A system, comprising:
   a processor that executes instructions stored in a memory to configure the processor to:
   receive a notification of a predicted deficiency of a renewable energy source for a location, the notification comprising a predicted severity and a predicted duration of the predicted deficiency;
   responsive to the predicted severity exceeding a first threshold and the predicted duration exceeding exceeds a second threshold, provision an initial amount of energy solely to a critical device at the location from an energy storage unit at the location; and
   responsive to the predicted severity exceeding a third threshold, greater than the first threshold, and the predicted duration exceeding a fourth threshold, greater than the second threshold, provision a second amount of energy solely to a non-critical device at the location from a vehicle proximate to the location.

7. The system of claim 6, wherein the processor is configured to:
   determine a time when renewable energy stored by the energy storage unit will not be sufficient to meet the predicted deficiency; and
   at the time, store a remaining amount of energy from the non-renewable energy source.

8. The system of claim 6, wherein the second amount of energy is excess energy of the vehicle.

9. The system of claim 6, wherein the processor is configured to:
   monitor an energy consumption rate of the critical device and the non-critical device.

10. The system of claim 6, wherein when the processor provisions the second amount of energy, the processor is further configured to:
    provide the second amount of excess energy in response to detecting that a duration of the predicted deficiency is greater than the predicted duration of the predicted deficiency.

11. A computer-readable storage medium comprising instructions that, when executed by a processor, cause the processor to perform:
    receiving a notification of a predicted deficiency of a renewable energy source for a location, the notification comprising a predicted severity and a predicted duration;

responsive to the predicted severity exceeding a first threshold and the predicted duration exceeding a second threshold, provisioning an initial amount of energy solely to a critical device at the location from an energy storage unit at the location; and responsive to the predicted severity exceeding a third threshold, greater than the first threshold, and the predicted duration exceeding a fourth threshold, greater than the second threshold, provisioning a second amount of energy solely to a non-critical device at the location from a vehicle proximate to the location.

12. The computer-readable storage medium of claim 11, wherein the instructions cause the processor to perform:
determining a time when renewable energy stored by the energy storage unit will not be sufficient to meet the predicted deficiency; and
at the time, storing a remaining amount of energy from a non-renewable energy source.

13. The computer-readable storage medium of claim 11, wherein the second amount of energy is excess energy of the vehicle.

14. The computer-readable storage medium of claim 11, wherein the instructions cause the processor to perform:
monitoring an energy consumption rate of the critical device and the non-critical device.

15. The computer-readable storage medium of claim 11, wherein the provisioning of the second amount of energy further comprises:
providing the second amount of energy in response to detecting that a duration of the predicted deficiency is greater than the predicted duration of the predicted deficiency.

* * * * *